United States Patent
Nishikawa et al.

(10) Patent No.: US 9,605,184 B2
(45) Date of Patent: Mar. 28, 2017

(54) PRESSURE-SENSITIVE ADHESIVE SHEET

(71) Applicant: NITTO DENKO CORPORATION, Ibaraki-shi, Osaka (JP)

(72) Inventors: Kenichi Nishikawa, Ibaraki (JP); Ryuuichi Kabutoya, Ibaraki (JP); Yoshihiro Okada, Ibaraki (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

(21) Appl. No.: 14/479,723

(22) Filed: Sep. 8, 2014

(65) Prior Publication Data

US 2015/0079385 A1 Mar. 19, 2015

(30) Foreign Application Priority Data

Sep. 13, 2013 (JP) .................. 2013-190669

(51) Int. Cl.
*B32B 7/12* (2006.01)
*C09J 7/02* (2006.01)
*C09J 153/02* (2006.01)

(52) U.S. Cl.
CPC ........... *C09J 7/0246* (2013.01); *C09J 7/0221* (2013.01); *C09J 7/0289* (2013.01); *C09J 153/02* (2013.01); *C09J 2201/16* (2013.01); *C09J 2433/00* (2013.01); *C09J 2433/006* (2013.01); *C09J 2453/00* (2013.01); *Y10T 428/249983* (2015.04); *Y10T 428/266* (2015.01)

(58) Field of Classification Search
CPC ....... C09J 7/0221; C09J 7/0246; C09J 7/0289
See application file for complete search history.

(56) References Cited

U.S. PATENT DOCUMENTS

| | | | | |
|---|---|---|---|---|
| 6,033,776 | A * | 3/2000 | Huddleston | B32B 7/12 138/144 |
| 6,197,419 | B1 | 3/2001 | Hyde et al. | |
| 2003/0091816 | A1 | 5/2003 | Takeda | |
| 2003/0211308 | A1 | 11/2003 | Khandpur et al. | |
| 2011/0129661 | A1* | 6/2011 | Tsubaki | C09J 7/0217 428/325 |
| 2014/0050874 | A1* | 2/2014 | Takeda | C09J 123/16 428/41.3 |

FOREIGN PATENT DOCUMENTS

| | | |
|---|---|---|
| EP | 0 888 882 A1 | 1/1999 |
| EP | 1 186 644 A2 | 3/2002 |

(Continued)

OTHER PUBLICATIONS

Extended European Search Report dated Feb. 3, 2015 from the European Patent Office in Counterpart Application No. 14184398.7.

*Primary Examiner* — Victor Chang

(74) *Attorney, Agent, or Firm* — Sughrue Mion, PLLC

(57) ABSTRACT

This invention provides a PSA sheet comprising a PSA layer (A) constituting an adhesive face and a viscoelastic layer (B) supporting the PSA layer (A). The PSA layer (A) comprises, as a base polymer (A), a block copolymer of a monovinyl-substituted aromatic compound and a conjugated diene compound. The base polymer (A) comprises 30% by mass or more of a diblock copolymer. The viscoelastic layer (B) has a thickness of 200 μm or larger.

20 Claims, 1 Drawing Sheet

(56) References Cited

FOREIGN PATENT DOCUMENTS

| EP | 2 226 369 A1 | 9/2010 | |
|---|---|---|---|
| EP | 2 551 315 A1 | 1/2013 | |
| EP | 2 639 280 A1 | 9/2013 | |
| JP | 11-310762 A | 11/1999 | |
| JP | 2012-519750 A | 8/2012 | |
| JP | WO 2012147464 A1 * | 11/2012 | ............ C09J 123/16 |
| WO | 99/54421 A1 | 10/1999 | |
| WO | 2010/101738 A1 | 9/2010 | |

* cited by examiner

PRESSURE-SENSITIVE ADHESIVE SHEET

CROSS-REFERENCE

The present application claims priority based on Japanese Patent Application No. 2013-190669 filed on Sep. 13, 2013 and the entire content thereof is incorporated herein by reference.

BACKGROUND OF THE INVENTION

1. Field of the Invention

The present invention relates to a pressure-sensitive adhesive sheet, in particular to a pressure-sensitive adhesive sheet comprising a pressure-sensitive adhesive layer comprising, as a base polymer, a block copolymer of a monovinyl-substituted aromatic compound and a conjugated diene compound.

2. Description of the Related Art

In general, pressure-sensitive adhesive (PSA) exists as a soft solid (a viscoelastic material) in a room temperature range and has a property to adhere easily to an adherend with some pressure applied. Taking advantage of such a property, PSA has been widely used as a means of attachment that offers excellent workability and produces dependable adhesion in various industrial fields from home appliances to automobiles, OA equipment, and so on. As the base polymer of PSA, a polymer that exhibits rubber elasticity at room temperature can be preferably used. Technical literatures related to PSA include Japanese Patent Application Publication No. H11-310762 and Japanese Patent Application Publication No. 2012-519750.

SUMMARY OF THE INVENTION

PSA is typically formed as a film and used in a form of a PSA sheet including the PSA film (PSA layer). Various properties are demanded of a PSA sheet depending on its intended purpose. For instance, it is useful to have a PSA sheet that has high resistance to peeling from a low polar adherend (i.e. high peel strength) in addition to excellent flexibility.

An objective of the present invention is thus to provide a PSA sheet exhibiting high peel strength to a low polar adherend while having excellent flexibility.

The PSA sheet disclosed by the present description comprises a PSA layer (A) constituting an adhesive face, and a viscoelastic layer (B) supporting the PSA layer (A). The PSA layer (A) comprises, as a base polymer (A), a block copolymer of a monovinyl-substituted aromatic compound and a conjugated diene compound. The base polymer (A) comprises 30% by mass or more of a diblock copolymer. The viscoelastic layer (B) typically has a thickness of 200 μm or larger.

Since the PSA layer (A) constituting the adhesive face comprises the block copolymer having a high diblock copolymer fraction as the base polymer (A), a PSA sheet having such a constitution may provide tight adhesion to an adherend. With the inclusion of the viscoelastic layer (B) having at least a prescribed thickness, the PSA sheet as a whole may have excellent flexibility. With the inclusion of such PSA layer (A) and viscoelastic layer (B), it may have high resistance to peeling from a low polar adherend (high peel strength, e.g. 90° peel strength measured based on the method described later in the worked examples).

The viscoelastic layer (B) may comprise an acrylic polymer as a base polymer (B). A viscoelastic layer (B) having such a composition is preferable since the balance between flexibility and cohesive strength can be easily adjusted.

The art disclosed herein can be preferably implemented in a form of a PSA sheet comprising a PSA layer (B) as the viscoelastic layer (B).

The art disclosed herein can be preferably practiced in an embodiment wherein the viscoelastic layer (B) comprises hollow particles. Hollow particles may serve as a filler in the viscoelastic layer (B) and increase the shear strength of the viscoelastic layer (B). Increased shear strength of the viscoelastic layer (B) may advantageously contribute to increase the resistance to peeling from an adhered (peel strength) of the PSA sheet disclosed herein. Since hollow particles have small specific gravities, the inclusion of hollow particles in the viscoelastic layer (B) is preferable also from the standpoint of reducing the weight of the PSA sheet.

The art disclosed herein can also be preferably implemented in an embodiment wherein the viscoelastic layer (B) has bubbles. The inclusion of bubbles in the viscoelastic layer (B) can further increase the flexibility of the PSA sheet. Such a PSA sheet is likely to provide a great ability to conform to a surface structure of an adherend and maintain tight adhesion between the adhesive face and adherend surface. This may advantageously contribute to increase the peel strength of the PSA sheet to various types of adherend including a low polar adherend.

In a preferable embodiment, the PSA layer (A) may comprise a tackifier resin $T_H$ having a softening point of 120° C. or above and a tackifier resin $T_L$ having a softening point below 120° C. A PSA sheet comprising such a PSA layer (A) may exhibit excellent peel strength to a low polar adherend.

The art disclosed herein can be preferably implemented in an embodiment where the PSA layer (A) comprises a tackifier resin $T_H$ having a softening point of 120° C. or above with the tackifier resin $T_H$ comprising a tackifier resin $T_{HR1}$ that has an aromatic ring and has a hydroxyl value of 30 mgKOH/g or lower. A PSA sheet comprising such a PSA layer (A) may exhibit excellent peel strength to a low polar adherend. The PSA layer (A) may further comprise a tackifier resin $T_L$ having a softening point below 120° C. A PSA sheet having such a PSA layer (A) may exhibit even better properties.

The PSA sheet disclosed herein may comprise, as the PSA layer (A), a first PSA layer (A) supported by the first face of the viscoelastic layer (B) and a second PSA layer (A) supported by the second face of the viscoelastic layer (B). In typical, a PSA sheet having such a constitution can be preferably used as a double-faced PSA sheet having a first adhesive face formed by the surface of the first PSA layer (A) and a second adhesive face formed by the surface of the second PSA layer (A).

DETAILED DESCRIPTION OF THE INVENTION

Figure 1:
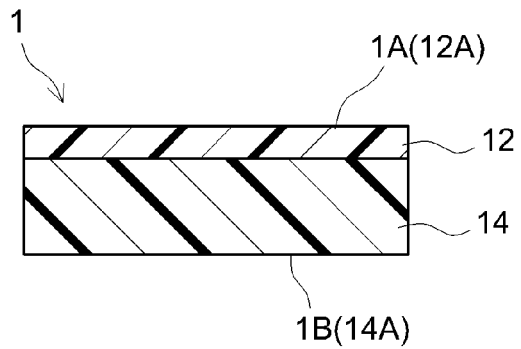
FIG. 1 shows a cross-sectional view schematically illustrating the constitution of a PSA sheet according to an embodiment.

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

In the drawings referenced below, a common reference numeral may be assigned to members or sites producing the same effects, and duplicated descriptions are sometimes omitted or simplified. The embodiments described in the drawings are schematized for clear illustration of the present invention, and do not represent the accurate sizes or reduction scales of the PSA sheet to be provided as an actual product by the present invention.

As used herein, the term "PSA" refers to, as described earlier, a material that exists as a soft solid (a viscoelastic material) in a room temperature range and has a property to adhere easily to an adherend with some pressure applied. As defined in "*Adhesion: Fundamental and Practice*" by C. A. Dahlquist (McLaren & Sons (1966), P. 143), PSA referred to herein is a material that has a property satisfying complex tensile modulus $E^*(1\ Hz)<10^7$ dyne/cm$^2$ (typically, a material that exhibits the described characteristics at 25° C.). The PSA in the art disclosed herein can be considered as nonvolatiles in a PSA composition or the constituent of a PSA layer.

The term "base polymer" of a PSA refers to the primary component among polymers (typically polymers that exhibit rubber elasticity in a room temperature range) contained in the PSA, that is, a component accounting for more than 50% by mass of all polymers.

As used herein, "block copolymer of a monovinyl-substituted aromatic compound and a conjugated diene compound" refers to a polymer comprising at least one each of a segment (segment A) that comprises a monovinyl-substituted aromatic compound as a primary monomer (which refers to a copolymer component accounting for more than 50% by mass; the same applies hereinafter) and a segment (segment B) that comprises a conjugated diene compound as a primary monomer, with the primary monomer being a copolymer component accounting for more than 50% by mass (the same applies hereinafter). In general, the glass transition temperature of segment A is higher than that of segment B. Examples of a typical constitution of such a block copolymer include an ABA triblock copolymer (triblock copolymer) having a segment A (hard segment) at each terminus of a segment B (soft segment), an AB diblock copolymer (diblock copolymer) formed of one segment A and one segment B, and the like.

As used herein, "styrene-based block copolymer" refers to a polymer comprising at least one styrene block. The "styrene block" refers to a segment comprising styrene as a primary monomer. A typical example of a styrene block referred to herein is a segment consisting essentially of styrene. "Styrene-isoprene block copolymer" refers to a polymer comprising at least one styrene block and at least one isoprene block (a segment comprising isoprene as a primary monomer). Typical examples of a styrene-isoprene block copolymer include a triblock copolymer having a styrene block (hard segment) at each terminus of an isoprene block (soft segment), a diblock copolymer formed of one isoprene block and one styrene block, and the like. Similarly, as used herein, the term "styrene-butadiene block copolymer" refers to a polymer comprising at least one styrene block and at least one butadiene block (a segment comprising butadiene as a primary monomer).

As used herein, "the styrene content" in a styrene-based block copolymer refers to the mass fraction of styrene residue contained in the total mass of the block copolymer. The styrene content can be measured by NMR (nuclear magnetic resonance spectroscopy).

The diblock content (which hereinafter may be referred to as the "diblock fraction" or "diblock ratio") in a styrene-based block copolymer can be determined by the following method. That is, a given styrene-based block copolymer is dissolved in tetrahydrofuran (THF) and subjected to high-performance liquid chromatography at a temperature of 40° C. with the THF as the mobile phase passing at a flow rate of 1 mL/min through four linearly connected columns consisting of two each of liquid chromatography columns GS5000H and G4000H both available from Tosoh Corporation; from the resulting chromatogram, the area of the peak corresponding to the diblock copolymer is determined; and the diblock fraction is determined as the percentage of the area of the peak corresponding to the diblock relative to the total area of all peaks.

<PSA Layer (A)>
[Base Polymer (A)]

The PSA layer (A) in the PSA sheet disclosed herein comprises as a base polymer (A) a block copolymer of a monovinyl-substituted aromatic compound and a conjugated diene compound. The monovinyl-substituted aromatic compound refers to a compound in which a functional group containing a vinyl group is bonded to an aromatic ring. Typical examples of the aromatic ring include a benzene ring (which can be a benzene ring substituted with a functional group (e.g., an alkyl group) containing no vinyl groups). Examples of the monovinyl-substituted aromatic compound include styrene, α-methyl styrene, vinyl toluene, vinyl xylene, and the like. Examples of the conjugated diene compound include 1,3-butadiene, isoprene, and the like. Among such block copolymers, one species can be used solely, or two or more species can be used in combination.

Segment A (hard segment) in the block copolymer preferably comprises the monovinyl-substituted aromatic compound (for which, one species can be used solely, or two or more species can be used together) at a copolymerization ratio of 70% by mass or greater. The copolymerization ratio of the monovinyl-substituted aromatic compound in the segment A is preferably 90% by mass or greater, or it can be essentially 100% by mass. Segment B (soft segment) in the block copolymer comprises the conjugated diene compound (for which, one species can be used solely, or two or more species can be used together) at a copolymerization ratio of preferably 70% by mass or greater. The copolymerization ratio of the conjugated diene compound in the segment B is preferably 90% by mass or greater, or it can be essentially 100% by mass. According to such a block copolymer, a PSA sheet of higher performance can be obtained.

The base polymer (A) preferably comprises 30% by mass or more of a diblock copolymer. With such a base polymer (A), it may be possible to obtain a PSA sheet capable of producing tight adhesion to an adherend. Tight adhesion to an adherend is advantageous from the standpoint of increasing the peel strength to various types of adherend and is especially significant with respect to a low polar adherend. From the standpoint of obtaining tighter adhesion, the ratio of the diblock copolymer to the total mass of the base polymer (A) (i.e. diblock fraction) is preferably 40% by mass or greater, more preferably 50% by mass or greater, or particularly preferably 60% by mass or greater (e.g. 65% by mass or greater).

The base polymer (A) typically comprises a diblock copolymer and a block copolymer that is not a diblock copolymer. The block copolymer that is not a diblock copolymer can be, for instance, a linear block copolymer such as a triblock copolymer or pentablock copolymer; etc.; a radial block copolymer; a mixture of these; and the like. It is preferable that a terminus of the polymer chain (preferably each terminus when the polymer is a linear block copolymer) has a segment A. Segment A placed terminally on the polymer chain is likely to aggregate to form a domain, whereby pseudo crosslinks are formed, possibly resulting in increased cohesive strength of the PSA. From the standpoint of the cohesive strength, etc., the base polymer (A) has a diblock fraction of suitably 90% by mass or lower, or preferably 85% by mass or lower (e.g. 80% by mass or lower). For instance, a preferable block copolymer has a diblock fraction of 60 to 85% by mass, or more preferably 70 to 85% by mass (e.g. 70 to 80% by mass). From the standpoint of the tightness of adhesion to an adherend surface, the ratio of the linear block copolymer (which refers to a diblock or triblock copolymer, but excludes a radial block copolymer) to the base polymer (A) is preferably 50% by mass or greater, more preferably 70% by mass or greater, or even more preferably 90% by mass or greater.

In a preferable embodiment of the art disclosed herein, the base polymer (A) is a styrene-based block copolymer. For instance, an embodiment wherein the base polymer (A) comprises at least one of a styrene-isoprene block copolymer or a styrene-butadiene block copolymer is preferable. It is preferable that the styrene-based block copolymer contained in the PSA comprises either a styrene-isoprene block copolymer at a ratio of 70% by mass or greater, a styrene-butadiene block copolymer at a ratio of 70% by mass or greater, or a styrene-isoprene block copolymer and a styrene-butadiene block copolymer at a combined ratio of 70% by mass or greater. In a preferable embodiment, essentially all (e.g., 95 to 100% by mass) of the styrene-based block copolymer is a styrene-isoprene block copolymer. In another preferable embodiment, essentially all (e.g., 95 to 100% by mass) of the styrene-based block copolymer is a styrene-butadiene block copolymer. According to such compositions, greater effects may be obtained by applying the art disclosed herein.

The styrene content in the styrene-based block copolymer can be, for instance, 5 to 40% by mass. From the standpoint of the cohesive strength, in usual, in a preferable styrene-based block copolymer, the styrene content is 10% by mass or greater, or more preferably greater than 10% by mass, for instance, 12% by mass or greater. From the standpoint of the peel strength, the styrene content is typically 35% by mass or less, preferably 30% by mass or less, or more preferably 25% by mass or less, or particularly preferably 20% by mass or less (typically, less than 20% by mass, e.g. 18% by mass or less). From the standpoint of obtaining greater effects by applying the art disclosed herein, can be preferably used a styrene-based block copolymer having a styrene content of 12% by mass or greater, but less than 20% by mass.

[Tackifier Resins]

The PSA layer (A) typically comprises a tackifier resin in addition to the base polymer (A). As the tackifier resin, can be used one, two or more species selected from various known tackifier resins such as petroleum resins, styrene-based resins, coumarone-indene resins, terpene resins, modified terpene resins, rosin-based resins, rosin-derivative resins, ketone-based resins, and the like.

Examples of petroleum resins include aliphatic (C5-based) petroleum resins, aromatic (C9-based) petroleum resins, aliphatic/aromatic copolymer (C5/C9-based) petroleum resins, hydrogenated products of these (e.g. alicyclic petroleum resins obtainable by hydrogenating aromatic petroleum resins) and the like.

Examples of styrene-based resins include a resin comprising a styrene homopolymer as a primary component, a resin comprising an α-methylstyrene homopolymer as a primary component, a resin comprising a vinyltoluene homopolymer as a primary component, a resin comprising as a primary component a copolymer having a monomer composition that includes two or more species among styrene, α-methylstyrene and vinyltoluene (e.g. an α-methylstyrene/styrene copolymer resin comprising an α-methylstyrene/styrene copolymer as a primary component) and the like.

As a coumarone-indene resin, can be used a resin comprising coumarone and indene as monomers constituting the backbone (main chain) of the resin. Examples of monomers that can be contained in the resin backbone other than coumarone and indene, include styrene, α-methylstyrene, methylindene, vinyltoluene and the like.

Examples of terpene resins include poly-α-pinene, poly-β-pinene, poly-dipentene, etc. Examples of modified terpene resins include those obtainable from these terpene resins via modifications (phenol modification, styrene modification, hydrogenation, hydrocarbon modification, or the like). Specific examples include terpene phenol resins, styrene-modified terpene resins, hydrogenated terpene resins, and the like.

The term "terpene phenol resin" refers to a polymer containing terpene residue and phenol residue, and the scope thereof encompasses both a copolymer of a terpene and a phenol (a terpene phenol copolymer resin) and a phenol-modified terpene resin, with the former being a copolymer of a terpene and a phenolic compound, and the latter being a phenol-modification product of a terpene homopolymer or a terpene copolymer (a terpene resin, typically an unmodified terpene resin). Preferable examples of a terpene constituting the terpene phenol resin include mono-terpenes such as α-pinene, β-pinene, limonene (including d-limonene, l-limonene, and d/l-limonene (dipentene)), and the like.

Examples of rosin-based resins include unmodified rosins (raw rosins) such as gum rosin, wood rosin, tall-oil rosin, etc.; modified rosins obtainable from these unmodified rosins via a modification such as hydrogenation, disproportionation, polymerization, etc. (hydrogenated rosins, disproportionated rosins, polymerized rosins, other chemically-modified rosins, etc.); and the like. Examples of rosin-derived resins include rosin esters such as unmodified rosins esterified with alcohols (i.e., esterification products of unmodified rosins) and modified rosins (hydrogenated rosins, disproportionated rosins, polymerized rosins, etc.) esterified with alcohols (i.e., esterification products of modified rosins), and the like; unsaturated fatty-acid-modified rosins obtainable from unmodified rosins and modified rosins (hydrogenated rosin, disproportionated rosin, polymerized rosin, etc.) via modifications with unsaturated fatty acids; unsaturated fatty-acid-modified rosin esters obtainable from rosin esters via modifications with unsaturated fatty acids; rosin alcohols obtainable via reduction of carboxyl groups from unmodified rosins, modified rosins (hydrogenated rosins, disproportionated rosins, polymerized rosin, etc.), unsaturated fatty-acid-modified rosins or unsaturated fatty-acid-modified rosin esters; metal salts of rosins including unmodified rosins, modified rosins, various rosin derivatives, etc. (in particular, metal salts of rosin esters); rosin phenol resins obtainable from rosins (unmodified rosins, modified rosins, various rosin derivatives, etc.) via addition of phenol in the presence of an acid catalyst followed by thermal polymerization; and so on.

(Tackifier Resin $T_H$)

The PSA layer (A) preferably comprises a tackifier resin $T_H$ having a softening point of 120° C. or above as the tackifier resin. From the standpoint of the repulsion resistance and the cohesiveness under high temperature (high temperature cohesive strength), the softening point of tackifier resin $T_H$ is preferably 125° C. or above, more preferably 130° C. or above, or even more preferably 135° C. or above (e.g. 140° C. or above). From the standpoint of the peel strength to an adherend, etc., in usual, the softening point of tackifier resin $T_H$ is suitably 200° C. or below, preferably 180° C. or below, or more preferably 170° C. or below (e.g. 160° C. or below).

The softening point of a tackifier resin referred to herein is defined as a value measured based on the softening point test method (ring and ball method) specified in JIS K5902 and JIS K2207. In particular, a sample is quickly melted at a lowest possible temperature, and with caution to avoid bubble formation, the melted sample is poured into a ring to the top, with the ring being placed on top of a flat metal plate. After cooled, any portion of the sample risen above the plane including the upper rim of the ring is sliced off with a small knife that has been somewhat heated. Following this, a support (ring support) is placed in a glass container (heating bath) having a diameter of 85 mm or larger and a height of 127 mm or larger, and glycerin is poured into this to a depth of 90 mm or deeper. Then, a steel ball (9.5 mm diameter, weighing 3.5 g) and the ring filled with the sample are immersed in the glycerin while preventing them from touching each other, and the temperature of glycerin is maintained at 20° C.±5° C. for 15 minutes. The steel ball is then placed at the center of the surface of the sample in the ring, and this is placed on a prescribed location of the support. While keeping the distance between the ring top and the glycerin surface at 50 mm, a thermometer is placed so that the center of the mercury ball of the thermometer is as high as the center of the ring, and the container is heated evenly by projecting a Bunsen burner flame at the midpoint between the center and the rim of the bottom of the container. After the temperature has reached 40° C. from the start of heating, the rate of the bath temperature rise must be kept at 5° C.±0.5° C. per minute. As the sample gradually softens, the temperature at which the sample flows out of the ring and finally touches the bottom plate is read as the softening point. Two or more measurements of softening point are performed at the same time, and their average value is used.

(Tackifier Resin $T_{HR1}$)

In a preferable embodiment of the art disclosed herein, the tackifier resin $T_H$ may comprise a tackifier resin $T_{HR1}$ having an aromatic ring while having a hydroxyl value of 30 mgKOH/g or lower. This can effectively improve the high temperature cohesive strength. For the tackifier resin $T_{HR1}$, solely one species or a combination of two or more species can be used.

The hydroxyl value of tackifier resin $T_{HR1}$ is preferably lower than 10 mgKOH/g, more preferably lower than 5 mgKOH/g, or even more preferably lower than 3 mgKOH/g. For example, a preferable tackifier resin $T_{HR1}$ has a hydroxyl value below 1 mgKOH/g or has no detectable hydroxyls.

Examples of a tackifier resin having an aromatic ring include the aromatic petroleum resins, aliphatic/aromatic copolymer-based petroleum resins, styrene-based resins, coumarone-indene resins, styrene-modified terpene resins, phenol-modified terpene resins, and rosin phenol resins described earlier, and the like. Among these, as the tackifier resin $T_{HR1}$, can be used a resin having a softening point of 120° C. or above (preferably 130° C. or above, e.g. 135° C. or above) while having a hydroxyl value of 30 mgKOH/g or lower (preferably lower than 5 mgKOH/g, e.g. lower than 1 mgKOH/g).

As the hydroxyl value, can be used a value measured by the potentiometric titration method specified in JIS K0070: 1992. Details of the method are described below.

[Method for Measuring Hydroxyl Value]

1. Reagents (1) As the acetylation reagent, is used a solution prepared by mixing with sufficient stirring about 12.5 g (approximately 11.8 mL) of anhydrous acetic acid and pyridine added up to a total volume of 50 mL. Alternatively, is used a solution prepared by mixing with sufficient stirring about 25 g (approximately 23.5 mL) of anhydrous acetic acid and pyridine up to a total volume of 100 mL.

(2) As the titrant, is used a 0.5 mol/L potassium hydroxide (KOH) solution in ethanol.

(3) For others, toluene, pyridine, ethanol and distilled water should be ready for use.

2. Procedures (1) Approximately 2 g of analyte is accurately weighed out in a flat-bottom flask, 5 mL of the acetylation reagent and 10 mL of pyridine are added, and an air condenser is placed on.

(2) The flask is heated in a bath at 100° C. for 70 minutes and then cooled. From the top of the condenser, 35 mL of toluene is added as a solvent and stirred. Subsequently, 1 mL of distilled water is added and the resultant is stirred to decompose any remaining anhydrous acetic acid. The flask is heated in the bath again for 10 minutes to complete the decomposition and then cooled.

(3) After rinsed with 5 mL of ethanol, the condenser is removed. Subsequently, 50 mL of pyridine is added as a solvent and the resultant is stirred.

(4) Using a volumetric pipette is added 25 mL of the 0.5 mol/L KOH ethanol solution.

(5) Potentiometric titration is carried out with the 0.5 mol/L KOH ethanol solution. The inflection point in the resulting titration curve is taken as the final point.

(6) For a blank titration, procedures (1) to (5) are carried out without addition of the analyte.

3. Calculations

The hydroxyl value is calculated by the following equation:

$$\text{Hydroxyl value}(mgKOH/g)=[(B-C)\times f\times 28.05]/S+D$$

Wherein:

B is the volume (mL) of the 0.5 mol/L KOH ethanol solution used in the blank titration;

C is the volume (mL) of the 0.5 mol/L KOH ethanol solution used to titrate the analyte;

f is the factor of the 0.5 mol/L KOH ethanol solution;

S is the mass of analyte (g);

D is the acid value;

28.05 is one half the molecular weight of KOH.

Preferable examples of materials usable as the tackifier resin $T_{HR1}$ include aromatic petroleum resins, aliphatic/aromatic copolymer-based petroleum resins, styrene-based resins and coumarone-indene resins. A preferable aliphatic/aromatic copolymer-based petroleum resin has a copolymerization ratio of C5 fractions below 15% by mass (more preferably below 10% by mass, even more preferably below 5% by mass, e.g. below 3% by mass). A preferable one has a copolymerization ratio of C9 fractions of 55% by mass or higher (more preferably 60% by mass or higher, even more preferably 65% by mass or higher).

Particularly preferable tackifier resins $T_{HR1}$ include aromatic petroleum resins and styrene-based resins (e.g. α-methylstyrene/styrene copolymer resin).

While, for practicing the art disclosed herein, it is unnecessary to reveal how the use of tackifier resin $T_{HR1}$ improves the high temperature cohesive strength, the following can be considered, for example. That is, the tackifier resin $T_{HR1}$ having an aromatic ring is likely to be compatible with a domain (or a "hard domain" hereinafter, e.g. a styrene domain in a styrene-based block copolymer) formed with aggregated hard segments comprising a monovinyl-substituted aromatic compound as a primary monomer. With a tackifier resin $T_{HR1}$ having a high softening point blending with a hard domain, the heat resistance of pseudo crosslinks by the hard domain may increase. This is considered to contribute to improve the high temperature cohesive strength of the PSA.

It is noted here that, as a general tendency, a tackifier resin $T_H$ having a high softening point is less compatible than a tackifier resin $T_L$ having a low softening point. Thus, even with it having an aromatic ring, a tackifier resin $T_H$ having a high hydroxyl value will blend only in a small amount with a hard domain or will be likely to undergo micro-scale phase separation in the hard domain to disturb the uniformity within the hard domain, making it difficult to suitably produce the effect of increasing the high temperature cohesive strength. This is more notable in a composition where the hard segment content in the base polymer (A) (e.g. the styrene content in a styrene-based block copolymer) is relatively low.

It is considered that despite of having a high softening point, the tackifier resin $T_{HR1}$ in the art disclosed herein has a hydroxyl value limited to 30 mgKOH/g or below; and therefore, it suitably blends with a hard domain even in a composition having a relatively low hard segment content (e.g. a styrene-based copolymer having a 20% by mass or lower styrene content), whereby the high temperature cohesive strength is effectively improved.

The amount of tackifier resin $T_{HR1}$ used is not particularly limited and it can be suitably selected according to the purpose or intended use of the PSA sheet. From the standpoint of the high temperature cohesive strength, in usual, the amount of tackifier resin $T_{HR1}$ used relative to 100 parts by mass of the base polymer (A) is preferably 5 parts by mass or greater, or more preferably 10 parts by mass or greater. From the standpoint of combining high temperature cohesive strength and peel strength at a high level, the amount of tackifier resin $T_{HR1}$ used relative to 100 parts by mass of the base polymer (A) can be, for instance, 100 parts by mass or less while it is usually preferable to be 80 parts by mass or less (e.g. 60 parts by mass or less). Alternatively, from the standpoint of the adhesive properties (e.g. peel strength) at low temperatures, etc., the amount of tackifier resin $T_{HR1}$ used relative to 100 parts by mass of the base polymer (A) can be 40 parts by mass or less, or even 30 parts by mass or less (e.g. 25 parts by mass or less).

Although not particularly limited, in an embodiment wherein the base polymer (A) is a styrene-based block copolymer, the amount of tackifier resin $T_{HR1}$ used relative to 1 part by mass of styrene in the block copolymer can be, for instance, 0.1 part by mass or greater. From the standpoint of the high temperature cohesive strength, it is preferably 0.2 part by mass or greater, or more preferably 0.5 part by mass or greater. The amount of tackifier resin $T_{HR1}$ used relative to 1 part by mass of styrene in the block copolymer can be, for instance, 10 parts by mass or less. From the standpoint of combining high temperature cohesive strength and peel strength at a high level, it is preferably 7 parts by mass or less, or more preferably 5 parts by mass or less (e.g. 3 parts by mass or less).

(Tackifier Resin $T_{HR2}$)

In a preferable embodiment of the art disclosed herein, the tackifier resin $T_H$ comprises a tackifier resin $T_{HR2}$ having an aromatic ring, but essentially free of isoprene units, terpene structures and rosin structures. This can effectively improve the high temperature cohesive strength. For the tackifier resin $T_{HR2}$, solely one species or a combination of two or more species can be used.

Herein, the tackifier resin $T_{HR2}$ being essentially free of isoprene units, terpene structures and rosin structures refers to that the combined ratio of these structural moieties (i.e. isoprene units, terpene structures and rosin structures) in the tackifier resin $T_{HR2}$ is below 10% by mass (more preferably below 8% by mass, more preferably below 5% by mass, e.g. below 3% by mass). The ratio can be zero % by mass. The isoprene unit content, terpene structure content and rosin structure content in the tackifier resin $T_{HR2}$ can be measured, for instance, by NMR (nuclear magnetic resonance spectrometry).

Examples of a tackifier resin having an aromatic ring, but essentially free of isoprene units, terpene structures and rosin structures include the aromatic petroleum resins, aliphatic/aromatic copolymer-based petroleum resins, styrene-based resins, coumarone-indene resins described above and the like. Among these, one having a softening point of 120° C. or above (preferably 130° C. or above; e.g. 135° C. or above) can be used as the tackifier resin $T_{HR2}$.

Particularly preferable tackifier resins T include aromatic petroleum resins and styrene-based resins (e.g. α-methylstyrene/styrene copolymer resin).

The tackifier resin $T_{HR2}$ has an aromatic ring that can readily compatible with a hard domain (e.g. styrene domain) in a block copolymer of a monovinyl-substituted aromatic compound and a conjugated diene compound (e.g. in a styrene-based block copolymer), but it is essentially free of isoprene units, terpene structure and rosin structures which are highly compatible with a soft segment (a segment comprising a conjugated diene compound as a primary monomer). Thus, a tackifier resin $T_{HR2}$ included in a PSA comprising the block copolymer as a base polymer (A) tends to be locally distributed (blended) in the hard domain, whereby the heat resistance of pseudo crosslinks by the hard domain can be efficiently increased. Being essentially free of isoprene units, terpene structures and rosin structures, it may avoid or suppress unfavorable effects (reduced peel strength, reduced effect of increasing the high temperature cohesive strength due to an insufficient amount blending with the hard domain, etc.) caused by the tackifier resin $T_{HR2}$ with a high softening point blending with soft segments to an excessive extent. By this means, a PSA sheet combining high temperature cohesive strength and peel strength at a high level can be obtained.

The amount of tackifier resin $T_{HR2}$ used is not particularly limited and it can be suitably selected according to the purpose or intended use of the PSA sheet. From the standpoint of the high temperature cohesive strength, in usual, the amount of tackifier resin $T_{HR2}$ used relative to 100 parts by mass of the base polymer (A) is preferably 5 parts by mass or greater, or more preferably 10 parts by mass or greater. From the standpoint of combining high temperature cohesive strength and peel strength at a high level, the amount of tackifier resin $T_{HR2}$ used relative to 100 parts by mass of the base polymer (A) can be, for instance, 100 parts by mass or less while it is usually preferable to be 80 parts by mass or less (e.g. 60 parts by mass or less). From the standpoint of the adhesive properties (e.g. peel strength) at low temperatures, etc., the amount of tackifier resin $T_{HR2}$ used relative to 100 parts by mass of the base polymer (A) can be 40 parts by mass or less, or even 30 parts by mass or less (e.g. 25 parts by mass or less).

Although not particularly limited, in an embodiment wherein the base polymer (A) is a styrene-based block copolymer, the amount of tackifier resin $T_{HR2}$ used relative to 1 part by mass of styrene in the block copolymer can be, for instance, 0.1 part by mass or greater. From the standpoint of the high temperature cohesive strength, it is preferably 0.2 part by mass or greater, or more preferably 0.5 part by mass or greater. The amount of tackifier resin $T_{HR2}$ used relative to 1 part by mass of styrene in the block copolymer can be, for instance, 10 parts by mass or less. From the standpoint of combining high temperature cohesive strength and peel strength at a high level, it is preferably 7 parts by mass or less, or more preferably 5 parts by mass or less (e.g. 3 parts by mass or less).

Although not particularly limited, for similar reasons as the tackifier resin $T_{HR1}$, a preferable tackifier resin $T_{HR2}$ has a hydroxyl value of 30 mgKOH/g or lower (preferably below 5 mgKOH/g, e.g. below 1 mgKOH/g). Accordingly, as the tackifier resin $T_{HR2}$ in the art disclosed herein, those that qualify as the tackifier resin $T_{HR1}$ can be preferable used. Similarly, as the tackifier resin $T_{HR1}$ in the art disclosed herein, those that qualify as the tackifier resin $T_{HR2}$ can be preferably used.

Depending on the purpose or application, etc., the art disclosed herein can be preferably implemented in an embodiment using tackifier resin(s) $T_{HR1}$ and/or $T_{HR2}$ along with other tackifier resin(s). Alternatively, it can be preferably practiced in an embodiment free of tackifier resins $T_{HR1}$ and $T_{HR2}$ while using solely other tackifier resin(s) as the tackifier resin. Alternatively, the art disclosed herein can be practiced in an embodiment free of tackifier resins.

(Tackifier Resin $T_L$)

A preferable example of an embodiment comprising other tackifier resin(s) is an embodiment comprising a tackifier resin $T_L$ having a softening point below 120° C. According to such an embodiment, for instance, a PSA sheet having greater peel strength can be obtained.

The lower limit of the softening point of tackifier resin $T_L$ is not particularly limited. In usual, one having a softening point of 40° C. or above (typically 60° C. or above) can be preferably used. From the standpoint of combining high temperature cohesive strength and peel strength at a high level, in usual, a tackifier resin $T_L$ having a softening point of 80° C. or above (more preferably 100° C. or above), but below 120° C. can be preferably used. In particular, it is preferable to use a tackifier resin $T_L$ having a softening point of 110° C. or above, but below 120° C.

The hydroxyl value and the structure (e.g. the presence of an aromatic ring, presence of isoprene units, presence of terpene structures, presence of rosin structures, etc.) of tackifier resin $T_L$ are not particularly limited. A suitable one can be selected and used among the various tackifier resins (petroleum resins, styrene-based resins, coumarone-indene resins, terpene resins, modified terpene resins, rosin-based resins, rosin-derivative resins, ketone-based resins, etc.) described earlier with them having a softening point below 120° C.

The art disclosed herein can be preferably practiced in an embodiment wherein the PSA layer (A) comprises, as tackifier resin $T_L$, at least either a petroleum resin or a terpene resin. For instance, can be preferably employed a composition wherein the primary component (i.e., a component accounting for more than 50% by mass) of the tackifier resin $T_L$ is a petroleum resin, a terpene resin, a combination of a petroleum resin and a terpene resin, or the like. From the standpoint of the adhesive strength and the compatibility, in a preferable embodiment, the primary component of the tackifier resin $T_L$ is a terpene resin (e.g., poly-β-pinene). Essentially all (e.g., 95% by mass or more) of the tackifier resin $T_L$ can be a terpene resin.

(Tackifier Resin $T_{HO}$)

Another preferable example of an embodiment comprising other tackifier resin(s) is an embodiment comprising a tackifier resin $T_H$ (which may be referred to as "tackifier resin $T_{HO}$" hereinafter) having a softening point of 120° C. or above while not being at least one of a tackifier resin $T_{HR1}$ and tackifier resin $T_{HR2}$. The use of tackifier resin $T_{HO}$ may be useful in increasing properties such as repulsion resistance or peel property under a constant load, etc.

As the tackifier resin $T_{HO}$, for example, can be used terpene phenol resins, rosin phenol resins, polymerized rosins, esterification products of polymerized rosins, etc. Among these tackifier resins $T_{HO}$, solely one species or a combination of two or more species can be used. In a preferable embodiment, one, two or more species of terpene phenol resin is used as the tackifier resin $T_{HO}$. For example, in a preferable embodiment, 25% by mass or greater (more preferably 30% by mass or greater) of the tackifier resin $T_{HO}$ is a terpene phenol resin. 50% by mass or greater (more preferably 70% by mass or greater, even more preferably 80% by mass or greater, e.g. 90% by mass or greater) of the tackifier resin $T_{HO}$ may be a terpene phenol resin, or essentially all (e.g. 95% by mass or greater) of the tackifier resin $T_{HO}$ may be a terpene phenol resin. A preferable terpene phenol resin has a softening point of 120° C. or above, but 200° C. or below (typically 130° C. or above, but 180° C. or below; e.g. 135° C. or above, but 170° C. or below).

The art disclosed herein can be practiced preferably, for instance, in an embodiment comprising, as the tackifier resin $T_{HO}$, a tackifier resin ($T_{HO1}$) having a hydroxyl value of 80 mgKOH/g or higher (e.g. 90 mgKOH/g or higher). The hydroxyl value of tackifier resin $T_{HO1}$ is typically 200 mgKOH/g or lower, or preferably 180 mgKOH/g or lower (e.g. 160 mgKOH/g or lower). For the hydroxyl value, can be used a value measured by the potentiometric titration method specified in JIS K0070:1992, specifically, a value determined by applying the method for measuring the hydroxyl value described earlier. According to a PSA comprising such a tackifier resin $T_{HO1}$, a PSA sheet of higher performance can be obtained. For example, it may be possible to obtain a PSA sheet combining high temperature cohesive strength and other properties (e.g. repulsion resistance, peel property under a constant load, etc.) at a higher level.

As the tackifier resin $T_{HO1}$, among the various tackifier resins listed earlier, can be used solely one species having a hydroxyl value equal to or higher than a prescribed value, or two or more such species in a suitable combination. In a preferable embodiment, as the tackifier resin $T_{HO1}$, at least a terpene phenol resin is used. A terpene phenol resin is preferable because the hydroxyl value can be changed at will by modifying the copolymerization ratio of phenol. Preferably, 50% by mass or greater (more preferably 70% by mass or greater, e.g., 90% by mass or greater) of the tackifier resin $T_{HO1}$ is a terpene phenol resin, or essentially all (e.g., 95 to 100% by mass, or even 99 to 100% by mass) thereof may be a terpene phenol resin.

The PSA layer (A) may comprise a tackifier resin ($T_{HO2}$) having a hydroxyl value of zero or higher, but below 80 mgKOH/g as the tackifier resin $T_{HO}$. A tackifier resin $T_{HO2}$ may be used as a substitute for a tackifier resin $T_{HO1}$ or in a combination with a tackifier resin $T_{HO1}$. A preferable embodiment comprises a tackifier resin $T_{HO1}$ having a hydroxyl value of 80 mgKOH/g or higher and a tackifier resin $T_{HO2}$. As the tackifier resin $T_{HO2}$, among the various tackifier resins listed earlier, can be used solely one species having a hydroxyl value in the cited range, or two or more such species in a suitable combination. For example, can be used a terpene phenol resin, a petroleum resin (e.g., C5-based petroleum resins), a terpene resin (e.g., (β-pinene polymers), a rosin-based resin (e.g., polymerized rosins), a rosin-derivative resin (e.g., esterification products of polymerized rosins), or the like, each having a hydroxyl value of zero or larger, but lower than 80 mgKOH/g.

The art disclosed herein can be practiced preferably in an embodiment wherein the PSA layer (A) comprises a combination of a tackifier resin $T_{HO1}$ having a hydroxyl value of 80 mgKOH/g or higher (typically 80 mgKOH/g to 160 mgKOH/g, e.g. 80 mgKOH/g to 140 mgKOH/g) and a tackifier resin $T_{HO2}$ having a hydroxyl value of 40 mgKOH/g or higher, but lower than 80 mgKOH/g. In this case, the amounts of $T_{HO1}$ and $T_{HO2}$ used are not particularly limited. For instance, the amounts of $T_{HO1}$ and $T_{HO2}$ used can be selected to have a mass ratio ($T_{HO1}:T_{HO2}$) in a range of 1:5 to 5:1 while, in usual, they are suitably selected so that their mass ratio is in a range of 1:3 to 3:1 (e.g. 1:2 to 2:1). In a preferable embodiment, each of $T_{HO1}$ and $T_{HO2}$ is a terpene phenol resin.

The total amount of the tackifier resins contained in the PSA layer (A) is not particularly limited. From the standpoint of combining high temperature cohesive strength and peel strength, in typical, relative to 100 parts by mass of the base polymer (A), it is suitably 20 parts by mass or greater, preferably 30 parts by mass or greater, or more preferably 40 parts by mass or greater (e.g. 50 parts by mass or greater). From the standpoint of the low temperature properties (e.g. low temperature peel strength), etc., in usual, the total amount of tackifier resins relative to 100 parts by mass of the base polymer (A) is suitably 200 parts by mass or less, preferably 150 parts by mass or less, or more preferably 120 parts by mass or less (e.g. 100 parts by mass or less).

Although not particularly limited, from the standpoint of the high temperature cohesive strength and repulsion resistance, etc., the total amount of tackifier resin $T_H$ relative to 100 parts by mass of the base polymer (A) (i.e. the total amount of the tackifier resin having a softening point of 120° C. or above) can be, for example, 10 parts by mass or greater, or preferably 20 parts by mass or greater (e.g. 25 parts by mass or greater). From the standpoint of the peel strength relative to a low polar adherend, the total amount of the tackifier resin $T_H$ can be 30 parts by mass or greater, or even 35 parts by mass or greater (e.g. 40 parts by mass or greater). From the standpoint of the flexibility and low temperature properties (e.g. low temperature peel strength), etc., in usual, the tackifier resin $T_H$ content relative to 100 parts by mass of the base polymer (A) is suitably 120 parts by mass or less, preferably 100 parts by mass or less, more preferably 80 parts by mass or less (e.g. 70 parts by mass or less). In view of more heavily emphasizing the low temperature properties, the total amount of tackifier resin $T_H$ relative to 100 parts by mass of the base polymer (A) can be 60 parts by mass or less, or even 50 parts by mass or less.

In an embodiment comprising a tackifier resin $T_L$, the total amount of tackifier resin $T_L$ relative to 100 parts by mass or the base polymer (A) is not particularly limited while it can be, for instance, 10 parts by mass or greater. From the standpoint of the peel strength, it is preferably 15 parts by mass or greater, or more preferably 20 parts by mass or greater. From the standpoint of the high temperature cohesive strength and repulsion resistance, the total amount of tackifier resin $T_L$ relative to 100 parts by mass of the base polymer (A) is suitably 120 parts by mass or less, preferably 90 parts by mass or less, or more preferably 70 parts by mass or less (e.g. 60 parts by mass or less). The tackifier resin $T_L$ content can be 50 parts by mass or less, or even 40 parts by mass or less.

The ratio of tackifier resin $T_L$ to the total amount of all the tackifier resins contained in the PSA layer (A) is not particularly limited. For instance, it can be 10 to 70% by mass, or it is usually preferable to be 20 to 50% by mass.

When the PSA layer (A) comprises a tackifier resin $T_L$ and a tackifier resin $T_H$, their amounts used are not particularly limited. Their amounts can be preferably selected so that the mass ratio $T_L:T_H$ is 1:5 to 3:1 (more preferably 1:5 to 2:1). The art disclosed herein can be practiced preferably in an embodiment wherein the PSA comprises more of $T_H$ than of $T_L$ as a tackifier resin. Such a PSA sheet may be of higher performance. For instance, in a preferable embodiment, the mass ratio $T_L:T_H$ is 1:1.2 to 1:5.

The ratio of tackifier resin $T_H$ to the total amount of all the tackifier resins contained in the PSA layer (A) is not particularly limited. The ratio can be, for instance, 30 to 90% by mass, or it is usually preferable to be 50 to 80% by mass.

Although not particularly limited, in the art disclosed herein, the ratio of tackifier resin $T_{HR1}$ to the total amount of all the tackifier resins contained in the PSA layer (A) can be, for instance, 1 to 100% by mass while it is usually preferably 5 to 80% by mass, more preferably 10 to 70% by mass, or even more preferably 20 to 60% by mass. The same applies to the ratio of tackifier resin $T_{HR2}$ to the total amount of all the tackifier resins contained in the PSA layer (A).

[Isocyanate Compound]

The PSA composition used to form the PSA layer (A) may comprise an isocyanate compound. According to such a PSA composition, can be obtained a PSA sheet of higher performance (e.g. having excellent repulsion resistance and peel property under a constant load). As the isocyanate compound, can be used preferably a polyfunctional isocyanate (which refers to a compound having an average of two or more isocyanate groups per molecule, including a compound having an isocyanurate structure). As the polyfunctional isocyanate, can be used one, two or more species selected from various isocyanate compounds (polyisocyanates) containing two or more isocyanate groups per molecule. Examples of such a polyfunctional isocyanate include aliphatic polyisocyanates, alicyclic polyisocyanates, aromatic polyisocyanates, and the like.

Examples of an aliphatic polyisocyanate include 1,2-ethylene diisocyanate; tetramethylene diisocyanates such as 1,2-tetramethylene diisocyanate, 1,3-tetramethylene diisocyanate, 1,4-tetramethylene diisocyanate, etc.; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, 2,5-hexamethylene diisocyanate, etc.;

2-methyl-1,5-pentane diisocyanate, 3-methyl-1,5-pentane diisocyanate, lysine diisocyanate, and the like.

Examples of an alicyclic polyisocyanates include isophorone diisocyanate; cyclohexyl diisocyanates such as 1,2-cyclohexyl diisocyanate, 1,3-cyclohexyl diisocyanate, 1,4-cyclohexyl diisocyanate, etc.; cyclopentyl diisocyanates such as 1,2-cyclopentyl diisocyanate, 1,3-cyclopentyl diisocyanate etc.; hydrogenated xylylene diisocyanate, hydrogenated tolylene diisocyanate, hydrogenated diphenylmethane diisocyanate, hydrogenated tetramethylxylene diisocyanate, 4,4'-dicyclohexylmethane diisocyanate, and the like.

Examples of an aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, xylylene-1,3-diisocyanate and the like.

A preferable example of an isocyanate compound includes a polyfunctional isocyanate having an average of three or more isocyanate groups per molecule. Such a tri-functional or higher polyfunctional isocyanate can be a multimer (typically a dimer or a trimer), a derivative (e.g., an addition product of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, polyester polyisocyanate, and the like. Commercial polyfunctional isocyanates include trade name "DURANATE TPA-100" available from Asahi Kasei Chemicals Corporation; trade names "CORONALE L", "CORONATE HL", "CORONATE HK", "CORONATE HX", "CORONATE 2096" available from Nippon Polyurethane Kogyo Co., Ltd.; and the like.

When an isocyanate compound is used, its amount used is not particularly limited. For instance, relative to 100 parts by mass of the base polymer (A), it can be more than zero part by mass, but 10 parts by mass or less (typically 0.01 to 10 parts by mass). In usual, an isocyanate compound can be used in an amount of suitably 0.1 to 10 parts by mass or preferably 0.1 to 5 parts by mass (typically 0.3 to 3 parts by mass, e.g., 0.5 to 1 part by mass) relative to 100 parts by mass of the base polymer (A). With use of an isocyanate compound in such a range, can be obtained a PSA sheet having particularly well-balanced properties.

[Other Components]

The PSA layer (A) may comprise, as necessary, one, two or more species of polymer besides the base polymer (A). Such a polymer can be a rubber-based polymer, acrylic polymer, polyester-based polymer, urethane-based polymer, polyether-based polymer, silicone-based polymer, polyamide-based polymer, fluorine-based polymer and the like known in the PSA field. When the PSA layer (A) comprises other polymer(s) besides the base polymer (A), the other polymer(s) can be used typically in an amount of suitably 50 parts by mass or less, preferably 30 parts by mass or less, or more preferably 10 parts by mass or less (e.g., 5 parts by mass or less) relative to 100 parts by mass of the base polymer (A). The art disclosed herein can be practiced preferably in an embodiment wherein the PSA layer (A) is essentially free of such other polymers besides the base polymer (A) (e.g., an embodiment where the other rubbery polymer content is zero to 3 parts by mass relative to 100 parts by mass of the base polymer (A)).

The PSA layer (A) may contain as necessary various additives generally used in the PSA field, such as leveling agent, crosslinking agent, crosslinking co-agent, plasticizer, softening agent, filler, colorant (pigment, dye, etc.), anti-static agent, anti-aging agent, ultraviolet light absorber, anti-oxidant, photostabilizing agent, and so on. With respect to these various additives, those heretofore known can be used by typical methods. The PSA disclosed herein can be made preferably in an embodiment essentially free of a liquid rubber such as liquid polybutene, etc., (e.g., where the liquid rubber content relative to 100 parts by mass of the base polymer (A) is 1 part by mass or less, or may be even zero part by mass). According to such a PSA, it may be possible to obtain a PSA sheet exhibiting even higher repulsion resistance and/or greater peel property under a constant load.

In a preferable embodiment, the PSA layer (A) may have a composition where the combined amount of the base polymer (A) and tackifier resins accounts for 90% by mass or more of the PSA layer (A). For example, in a preferable embodiment, the combined amount of the base polymer (A) and tackifier resins accounts for 90 to 99.8% by mass (typically, for instance, 95 to 99.5% by mass) of the PSA layer (A).

The form of the PSA composition used to form the PSA layer (A) is not particularly limited. For instance, it can be a solvent-based PSA composition containing a PSA (an adhesive component) having a composition described above in an organic solvent, a water-dispersed (typically, an aqueous emulsion-based) PSA composition containing a PSA dispersed in an aqueous solvent, a hot-melt-type PSA composition or the like. From the standpoint of the PSA's applicability or latitude in the choice of a substrate, etc., a solvent-based or a water-dispersed PSA composition can be used preferably.

From the standpoint of obtaining even greater adhesive properties, a solvent-based PSA composition is especially preferable. A solvent-based PSA composition can typically be prepared as a solution containing the respective components described above in an organic solvent. The organic solvent can be selected among known or conventional organic solvents. For instance, can be used any one species or a mixture of two or more species among aromatic compounds (typically aromatic hydrocarbons) such as toluene, xylene, etc.; acetic acid esters such as ethyl acetate, butyl acetate, etc.; aliphatic or alicyclic hydrocarbons such as hexane, cyclohexane, methyl cyclohexane, etc.; halogenated alkanes such as 1,2-dichloroethane, etc.; ketones such as methyl ethyl ketone, acetyl acetone, etc.; and the like.

While not particularly limited, in usual, the solvent-based PSA composition is suitably prepared to have a solid content (NV) of 30 to 65% by mass (e.g., 40 to 55% by mass). Too low an NV tends to result in higher production costs while too high an NV may lower the workability such as the PSA's applicability, etc.

As the method for forming a PSA layer (A) from a PSA composition, various heretofore known methods can be employed. For instance, can be employed a method where the PSA composition is applied to a prescribed surface and cured to form a PSA layer (A) on the surface. For curing the PSA composition, methods such as drying (removal of the solvent), irradiation of an active energy ray (e.g. UV rays), etc., can be preferably employed.

The PSA composition can be applied, for instance, with a known or commonly-used coater such as gravure roll coater, reverse roll coater, kiss roll water, dip roll coater, bar coater, knife water, spray coater, or the like.

From the standpoint of facilitating the crosslinking reaction and increasing the productivity, the PSA composition is dried preferably with heating. The drying temperature is not particularly limited. It can be typically around 40° C. to 150° C., or preferably 50° C. to 140° C., for instance, 60° C. to 130° C. The drying time is not particularly limited while it can be about a few tens of seconds to a few minutes (e.g. within about 10 minutes, preferably about 30 seconds to 5 minutes). After this, an additional drying step may be included as necessary.

The irradiation of an active energy ray can be carried out by a conventional method, using a commercial active energy ray irradiation device (e.g. UV irradiation device).

The PSA layer (A) is typically formed in a continuous manner. Depending on the purpose and application, it can be formed in a regular or random pattern of dots, stripes, etc.

There are not particular limitations to the method for forming a PSA sheet comprising a PSA layer (A) and a viscoelastic layer (B). For instance, can be preferably employed a method such that a PSA layer (A) is formed on a readily releasable surface (release face, e.g. a surface of a release liner) and the PSA layer (A) is adhered (transferred) to a surface of a viscoelastic layer (B). A PSA composition for forming a PSA layer (A) can be applied to a surface of a viscoelastic layer (B) and allowed to cure (e.g. by drying) to form a PSA layer (A) on the surface of the viscoelastic layer (B). Alternatively, a PSA composition for forming a viscoelastic layer (B) may be applied to a surface of a PSA layer (A) and allowed to cure (e.g. by UV rays) to form a viscoelastic layer (B) on the surface of the PSA layer (A).

<Viscoelastic Layer (B)>

[Base Polymer (B)]

While the composition of the viscoelastic layer (B) exhibits viscoelastic properties in a temperature range around room temperature, there are no particular limitations to the composition. The viscoelastic layer (B) may comprise one, two or more species selected from various viscoelastic materials such as acrylic viscoelastic materials, rubber-based viscoelastic materials, silicone-based viscoelastic materials, polyester-based viscoelastic materials, urethane-based viscoelastic materials, polyether-based viscoelastic materials, polyamide-based viscoelastic materials, fluorine-based viscoelastic materials, and the like. Herein, the term acrylic viscoelastic material refers to a viscoelastic material comprising an acrylic polymer as the base polymer (primary component among polymers, i.e. a component accounting for more than 50% of the content). The same applies to the rubber-based and other viscoelastic materials. It is noted that the viscoelastic material referred to herein is a material combining viscous and elastic properties, that is, a material having properties satisfying that the complex modulus of elasticity has a phase angle above zero, but below $\pi/2$ (typically, a material having the properties at 25° C.). From the standpoint of the flexibility, etc., a preferable material has properties satisfying a complex modulus of elasticity $E^*(1\ Hz)<10^7$ dyne/cm$^2$ (typically, a material having the property at 25° C.).

The viscoelastic layer (B) may be an adhesive layer or a non-adhesive layer. The term "adhesive layer" herein refers to a layer having a peel strength of 0.1 N/20 mm or greater when measured based on JIS Z0237 (2004), such that with a SUS304 stainless steel plate being an adherend, 30 minutes after press-bonded to the adherend with a 2 kg roller moved back and forth once in a measurement environment at 23° C., the layer is peeled in the 180° direction at a tensile speed of 300 mm/min. It is also referred to as a PSA layer. The term "non-adhesive layer" refers to a layer that is not considered as the adhesive layer, typically with the peel strength being below 0.1 N/20 mm. A layer that does not bond to a SUS304 stainless steel plate when press-bonded to the stainless steel plate with a 2 kg roller moved back and forth once at 23° C. (i.e. a layer that is essentially non-adhesive) is a typical example included in the concept of the non-adhesive layer referred to herein. Although not particularly limited, the art disclosed herein can be preferably implemented in an embodiment comprising a viscoelastic layer (B) that is also an adhesive layer, that is, an embodiment comprising a PSA layer (B) as the viscoelastic layer (B).

In a preferable embodiment, the viscoelastic layer (B) may be a layer comprising an acrylic polymer as the base polymer (B), that is, an acrylic viscoelastic layer. A viscoelastic layer (B) having such a composition is preferable since the balance between flexibility and cohesiveness can be readily adjusted. The proportion of the acrylic polymer contained in the viscoelastic layer (B) is not particularly limited. It is typically 50% by mass or greater, preferably 70% by mass or greater, or more preferably 80% by mass or greater.

As the acrylic polymer, for example, a polymer of starting monomer(s) comprising an alkyl (meth)acrylate as the primary monomer and possibly further comprising a secondary monomer copolymerizable with the primary monomer is preferable. The primary monomer herein refers to a component that accounts for more than 50% by mass of all the monomers contained in the starting monomer(s). In typical, the composition of monomers contained in the starting monomer(s) is approximately equivalent to the composition of monomeric units contained in the acrylic polymer.

As the alkyl (meth)acrylate, for instance, a compound represented by the following general formula (I) can be used:

$$CH_2=C(R^1)COOR^2 \qquad (1)$$

Herein, $R^1$ in the formula (I) is a hydrogen atom or a methyl group. $R^2$ is an alkyl group having 1 to 20 carbon atoms (hereinafter, such a range of the number of carbon atoms may be indicated as "$C_{1-20}$"). From the standpoint of the storage elastic modulus of PSA, an alkyl (meth)acrylate with $R^2$ being a $C_{1-14}$ alkyl group is preferable, an alkyl (meth)acrylate with $R^2$ being a $C_{1-10}$ alkyl group is more preferable, and an alkyl (meth)acrylate with $R^2$ being a butyl group or a 2-ethylhexyl group is particularly preferable.

Examples of an alkyl (meth)acrylate with $R^2$ being a $C_{1-20}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. Among these alkyl (meth)acrylates, can be used one species solely or a combination of two or more species. Particularly preferable alkyl (meth)acrylates include n-butyl acrylate (BA) and 2-ethylhexyl acrylate (2EHA).

Although not particularly limited, the amount of the alkyl (meth)acrylate can be, for instance, 60% by mass or more of all the monomers constituting the acrylic polymer, or it is usually preferably 70% by mass or more, or more preferably 80% by mass or more. From the standpoint of the cohesive strength of the viscoelastic layer (B), etc., the amount of the acrylic (meth)acrylate is suitably 99.5% by mass or less, preferably 99% by mass or less, or more preferably 95% by mass or less.

Examples of the secondary monomer include a monomer having a functional group (or a "functional group-containing monomer" hereinafter). Such a functional group-containing monomer can be used to introduce crosslinking points in the acrylic polymer so as to increase the cohesive strength of the viscoelastic layer (B). Examples of such a functional group-containing monomer include the following:

Carboxyl group-containing monomers including ethylenic unsaturated monocarboxylic acids such as acrylic acid, methacrylic acid, crotonic acid, carboxyethyl (meth)acrylate, carboxypentyl (meth)acrylate, etc.; ethylenic unsaturated dicarboxylic acids such as itaconic acid, maleic acid, fumaric acid, citraconic acid, etc., as well as their metal salts (e.g. alkali metal salts);

Acid anhydride group-containing monomers including acid anhydrides of the ethylenic unsaturated dicarboxylic acids such as maleic anhydride, itaconic anhydride, etc.;

Hydroxyl group-containing monomers including hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl (meth)acrylate, etc.; unsaturated alcohols such as N-methylol (meth)acrylamide, vinyl alcohol, allyl alcohol, 2-hydroxyethyl vinyl ether, 4-hydroxybutyl vinyl ether, diethylene glycol monovinyl ether, etc.; and the like;

Amide group-containing monomers such as (meth)acrylamide, N,N-dimethyl(meth)acrylamide, N-butyl (meth)acrylamide, N-methylol(meth)acrylamide, N-methylolpropane(meth)acrylamide, N-methoxymethyl(meth)acrylamide, N-butoxymethyl(meth)acrylamide, etc.;

Cyano group-containing monomers such as acrylonitrile, methacrylonitrile, etc.;

Sulfonic acid group-containing monomers such as styrene sulfonic acid, allyl sulfonic acid, 2-(meth)acrylamido-2-methylpropanesulfonic acid, (meth)acrylamidopropanesulfonic acid, sulfopropyl (meth)acrylate, (meth)acryloxynaphthalene sulfonic acid, etc.;

Phosphoric acid group-containing monomers such as 2-hydroxyethyl acryloyl phosphate, etc.;

Oxazoline group-containing monomers such as 2-vinyl-2-oxazoline, 2-vinyl-5-methyl-2-oxazoline, 2-isopropenyl-2-oxazoline, etc.;

Aziridine group-containing monomers such as (meth) acryloylaziridine, 2-aziridinylethyl (meth)acrylate, etc.;

Amino group-containing monomers such as aminoethyl (meth)acrylate, N,N-dimethylaminoethyl (meth)acrylate, N,N-dimethylaminopropyl (meth)acrylate, t-butylaminoethyl (meth)acrylate, etc.;

Epoxy group-containing (glycidyl group-containing) monomers such as glycidyl (meth)acrylate, methylglycidyl (meth)acrylate, allyl glycidyl ether, etc.;

Keto group-containing monomers such as diacetone (meth)acrylamide, diacetone (meth)acrylate, vinyl methyl ketone, vinyl ethyl ketone, allyl acetoacetate, vinyl acetoacetate, etc.;

Isocyanate group-containing monomers such as 2-(meth) acryloyloxyethyl isocyanate, etc.;

Alkoxyl group-containing monomers such as methoxyethyl (meth)acrylate, ethoxyethyl (meth)acrylate, propoxyethyl (meth)acrylate, butoxyethyl (meth)acrylate, ethoxypropyl (meth)acrylate, etc.;

Alkoxysilyl group-containing monomers such as (3-(meth)acryloxypropyl)trimethoxysilane, (3-(meth)acryloxypropyl)triethoxysilane, (3-(meth)acryloxypropyl)methyldimethoxysilane, (3-(meth)acryloxypropyl) methyldiethoxysilane, etc.; and the like.

Other examples include a macromonomer having a radically polymerizing vinyl group at the monomer end-group in a vinylic polymer. These can be used singly as one species or in combination of two or more species.

When a functional group-containing monomer as those described above is used as the secondary monomer, its amount used can be suitably selected so as to obtain desirable cohesive strength, and it is not particularly limited. The amount of the functional group-containing monomer used can be, for instance, 0.5% by mass or more of all the monomers constituting the acrylic polymer. It is usually suitably 1% by mass or more, preferably 3% by mass or more, or more preferably 5% by mass or more. From the standpoint of combining flexibility and cohesive strength at a good balance, the amount of the functional group-containing monomer is suitably 30% by mass or less of all the monomers, preferably 25% by mass or less, or more preferably 20% by mass or less.

In order to adjust the glass transition temperature (Tg) or to increase the cohesive strength, etc., the starting monomer(s) may comprise secondary monomer(s) other than the aforementioned functional group-containing monomer. Examples of such secondary monomers include the following:

Carboxylic acid vinyl esters such as vinyl acetate, vinyl propionate, vinyl lactate, vinyl pyvalate, vinyl cyclohexanecarboxylate, vinyl benzoate, etc.;

Aromatic vinyl compounds such as styrene, substituted styrenes (α-methylstyrene, etc.), vinyl toluene, etc.;

Aromatic ring-containing (meth)acrylates such as aryl (meth)acrylate (e.g. phenyl (meth)acrylate), aryloxyalkyl (meth)acrylate (e.g. phenoxyethyl (meth)acrylate), arylalkyl (meth)acrylate (e.g. benzyl (meth)acrylate), etc.;

Monomers having nitrogen atom-containing rings such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, etc.;

Olefinic monomers such as ethylene, propylene, isoprene, butadiene, isobutylene, etc.;

Chlorine-containing monomers such as vinyl chloride, vinylidene chloride, etc.;

Vinyl ether-based monomers such as methyl vinyl ether, ethyl vinyl ether, etc.; and the like. These can be used singly as one species or in combination of two or more species. The amount of such secondary monomer(s) used can be suitably selected depending on the purpose and application, and is not particularly limited. For example, it is preferably 10% by mass or less of all the monomers.

The starting monomer(s) may comprise as necessary a polyfunctional monomer for crosslinking, etc. Examples of such a polyfunctional monomer include monomers having two or more polymerizable functional groups (typically (meth)acryloyl groups) per molecule, such as 1,6-hexanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, trimethylolpropane tri(meth)acrylate, ethyleneoxide-modified trimethylolpropane tri(meth)acrylate, pentaerythritol tri(meth)acrylate, dipentaerythritol penta(meth)acrylate, dipentaerythritol hexa(meth)acrylate, etc. These can be used singly as one species or in combination of two or more species. From the standpoint of the reactivity, etc., it is usually preferable to use a polyfunctional monomer having two or more (typically three or more) acryloyl groups per molecule. When such a polyfunctional monomer is used, its amount used is not particularly limited. From the standpoint of the flexibility of the viscoelastic layer (B), it is usually suitable to be 2% by mass or less (more preferably 1% by mass or less) of all the monomers.

The monomer composition of the acrylic polymer can be selected so that the resulting acrylic polymer has a Tg of, for instance, −70° C. or above, but −10° C. or below. From the standpoint of the flexibility, the acrylic polymer has a Tg of suitably −20° C. or below, preferably −30° C. or below, more preferably −40° C. or below, or yet more preferably −50° C. or below. From the standpoint of the cohesive strength of the viscoelastic layer (B), the Tg is usually preferable to be −65° C. or above.

Herein, the Tg of the acrylic polymer refers to a value determined by the Fox equation based on the Tg values of homopolymers of the respective monomers constituting the acrylic polymer and weight fractions (copolymer ratio by weight) of the monomers. Thus, the Tg of an acrylic polymer can be adjusted by suitably modifying the monomer composition (i.e. types and relative amounts of monomers used for the synthesis of the acrylic polymer).

As the Tg values of the homopolymers, values given in a known document are used.

In the art disclosed herein, as the Tg values of the homopolymers, the following values are used specifically:

| | |
|---|---|
| 2-ethylhexyl acrylate | −70° C. |
| n-butyl acrylate | −55° C. |
| methyl acrylate | 8° C. |
| methyl methacrylate | 105° C. |
| acrylic acid | 106° C. |
| methacrylic acid | 228° C. |

With respect to the Tg values of homopolymers other than the examples listed above, the values given in "Polymer Handbook" (3rd edition, John Wiley & Sons, Inc., Year 1989) are used.

When no values are given in the reference book, values obtained by the following measurement method are used (see Japanese Patent Application Publication No. 2007-51271).

In particular, to a reaction vessel equipped with a thermometer, a stirrer, a nitrogen inlet and a condenser, are added 100 parts by weight of monomer(s), 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by mass solid content is obtained. Then, this homopolymer solution is applied onto a release liner by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature value at the maximum of the tan δ curve is taken as the Tg of the homopolymer.

The acrylic polymer can be prepared by a known or commonly-used polymerization method. As the polymerization method, can be suitably employed, for instance, thermal polymerization (typically carried out in the presence of a thermal polymerization initiator) such as solution polymerization, emulsion polymerization, bulk polymerization, etc.; active energy ray polymerization carried out by irradiating an active energy ray including lights such as UV lights, etc., as well as radioactive rays such as β rays, γ rays, etc.; and the like. Examples of the active energy ray polymerization referred to herein include photopolymerization carried out by irradiating lights such as UV lights (typically carried out in the presence of a photopolymerization initiator) as well as radiation polymerization carried out by irradiating ionizing radiation such as α rays, β rays, γ rays, neutron beams, electron beams, etc. These polymerization methods can be used singly as one type or in combination of two or more different types.

For the polymerization, depending on the polymerization method and embodiment, etc., a known or commonly-used polymerization initiator can be used. For the polymerization initiator, solely one species or a combination of two or more species can be used.

For advantages such as shortened polymerization time, etc., a photopolymerization initiator can be preferably used. Examples of the photopolymerization initiator include, but not particularly limited to ketal-based photopolymerization initiators, acetophenone-based photopolymerization initiators, benzoin ether-based photopolymerization initiators, acylphosphine oxide-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, thioxanthone-based photopolymerization initiators and the like.

Specific examples of ketal-based photopolymerization initiators include 2,2-dimethoxy-1,2-diphenylethane-1-one (e.g. trade name "IRGACURE 651" available from BASF Japan Ltd.), etc.

Specific examples of acetophenone-based photopolymerization initiators include 1-hydroxycyclohexyl phenyl ketone (e.g. trade name "IRGACURE 184" available from BASF Japan Ltd.), 4-phenoxydichloroacetophenone, 4-t-butyl-dichloroacetophenone, 1-[4-(2-hydroxyethoxy)-phenyl]-2-hydroxy-2-methyl-1-propane-1-one (e.g. trade name "IRGACURE 2959" available from BASF Japan Ltd.), 2-hydroxy-2-methyl-1-phenyl-propane-1-one (e.g. trade name "Darocur 1173" available from BASF Japan Ltd.), methoxyacetophenone, etc.

Specific examples of benzoin ether-based photopolymerization initiators include benzoin ethers such as benzoin methyl ether, benzoin ethyl ether, benzoin propyl ether, benzoin isopropyl ether, benzoin isobutyl ether, etc., as well as substituted benzoin ethers such as anisole methyl ether, etc.

Specific examples of acylphosphine oxide-based photopolymerization initiators include bis(2,4,6-trimethylbenzoyl)phenylphosphine oxide (e.g. trade name "IRGACURE 819" available from BASF Japan Ltd.), bis(2,4,6-trimethylbenzoyl)-2,4-di-n-butoxyphenylphosphine oxide, 2,4,6-trimethylbenzoyldiphenylphosphine oxide (e.g. trade name "LUCIRIN TPO" available from BASF Japan Ltd.), bis(2,6-dimethoxybenzoyl)-2,4,4-trimethylpentylphosphine oxide, etc.

Specific examples of α-ketol-based photopolymerization initiators include 2-methyl-2-hydroxypropiophenone, 1-[4-(2-hydroxyethyl)phenyl]-2-methylpropane-1-one, etc. Specific examples of aromatic sulfonyl chloride-based photopolymerization initiators include 2-naphthalenesulfonyl chloride, etc. Specific examples of photoactive oxime-based photopolymerization initiators include 1-phenyl-1,1-propanedione-2-(o-ethoxycarbonyl)-oxime, etc. Specific examples of benzoin-based photopolymerization initiators include benzoin, etc. Specific examples of benzil-based photopolymerization initiators include benzil, etc.

Specific examples of benzophenone-based photopolymerization initiators include benzophenone, benzoylbenzoic acid, 3,3'-dimethyl-4-methoxybenzophenone, polyvinylbenzophenone, α-hydroxycyclohexylphenylketone, etc.

Specific examples of thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone, etc.

The initiator for thermal polymerization is not particularly limited. For example, can be used an azo-based polymerization initiator, peroxide-based polymerization initiator, a redox-based polymerization initiator by combination of a peroxide and a reducing agent, a substituted ethane-based polymerization initiator, etc. More specific examples include, but not limited to azo-based initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane]dihydrochloride, 2,2'-azobis(N,N'-dimethyleneisobutylamidine), 2,2'-azobis[N-(2-carboxyethyl)-2-methylpropionamidine]hydrate, etc.; persulfates such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; redox-based initiators such as combination of a persulfate salt and sodium hydrogen sulfite, combination of a peroxide and sodium ascorbate, etc.; and the like. Thermal polymerization can be preferably carried out at a temperature of, for instance, about 20° C. to 100° C. (typically 40° C. to 80° C.).

Such thermal polymerization initiator or photopolymerization initiator can be used in a typical amount in accordance with the polymerization method or embodiment, etc., without particular limitations. For example, to 100 parts by mass of the starting monomer(s), an initiator can be used at 0.001 to 5 parts by mass (typically, 0.01 to 2 parts by mass, e.g. 0.01 to 1 part by mass).

As the composition for forming the viscoelastic layer (B), can be preferably used a composition comprising a partially-polymerized product obtained by partially polymerizing the monomers. Such a partially-polymerized product typically has a syrup form (viscous liquid form) in which a polymer formed from part of the monomers and unreacted monomers are present as a mixture. Hereinafter, a partially-polymerized product having such a form may be referred to as "monomer syrup" or simply "syrup". The polymerization method for obtaining the partially-polymerized product is not particularly limited. A suitable method can be selected and employed among various polymerization methods as those described earlier. From the standpoint of the efficiency and convenience, a photopolymerization method can be preferably employed. According to a photopolymerization, depending on the polymerization conditions such as irradiation dose (light quantity), etc., the polymer conversion of the monomer mixture can be easily controlled.

The composition for forming the viscoelastic layer (B) (viscoelastic layer-forming composition) may be in a form comprising an acrylic polymer (e.g. acrylic polymer at 95% or higher polymer conversion of the monomers) as a fully-polymerized product of the monomers. For instance, it may be in a form of a solvent-based composition comprising such an acrylic polymer in an organic solvent, a water-dispersed composition such that the acrylic polymer is dispersed in an aqueous solvent, etc.

The composition for forming the viscoelastic layer (B) may comprise a crosslinking agent. As the crosslinking agent, can be used a crosslinking agent commonly known or used in the acrylic PSA field. Examples include epoxy-based crosslinking agents, isocyanate-based crosslinking agents, silicone-based crosslinking agents, oxazoline-based crosslinking agents, aziridine-based crosslinking agents, silane-based crosslinking agents, alkyletherified melamine-based crosslinking agent, metal chelate-based crosslinking agent, and the like. Alternatively, the composition may be essentially free of such a crosslinking agent.

[Filler]

The viscoelastic layer (B) may comprise a filler. The inclusion of a filler in a viscoelastic layer (B) can increase the shear strength of the viscoelastic layer (B). This may increase the resistance against peeling the PSA sheet from an adherend (peel strength). The use of a filler can suppress excessive deformation of the viscoelastic layer (B), allowing for suitable adjustment of the balance between flexibility and cohesive strength of the PSA sheet as a whole.

As the filler, various particulate substances can be used. Examples of a material constituting such a particulate substance include metals such as copper, nickel, aluminum, chromium, iron, stainless steel, etc.; metal oxides such as alumina, zirconia, etc.; carbides such as silicon carbide, boron carbide, nitrogen carbide, etc.; nitrides such as aluminum nitride, silicon nitride, boron nitride, etc.; other inorganic materials such as calcium carbide, calcium carbonate, aluminum hydroxide, glass, silica, etc.; polymers such as a polystyrene, acrylic resin (e.g. poly(methyl methacrylate)), phenol resin, benzoguanamine resin, urea resin, silicone resin, nylon, polyester, polyurethane, polyethylene, polypropylene, polyamide, polyimide, silicone, vinylidene chloride, etc.; and the like. Alternatively, particles of natural materials such as volcanic shirasu, sand and the like can be used. These can be used singly as one species or in combination of two or more species.

The external form of the particulate substance and the particle structure are not particularly limited. The external form of the particulate substance may be globular, flaky, irregularly-shaped, etc. The particle structure of the particulate substance may be, for instance, dense, porous, hollow, etc.

The art disclosed herein may be preferably implemented in an embodiment where the viscoelastic layer (B) comprises as the filler a particulate substance having a hollow particle structure (or "hollow particles" hereinafter). From the standpoint of the photopolymerizability (polymerizability) of the PSA composition, hollow particles formed from an inorganic material can be preferably used. Examples of such hollow particles include balloons made of glass such as hollow glass balloons, etc.; hollow balloons made of metal compounds such as hollow alumina balloons, etc.; hollow balloons made of ceramics such as hollow ceramic balloons, etc.; and the like.

As the hollow glass balloon, can be used commercial products such as trade names "GLASS MICRO BALLOON", "FUJI BALLOON H-40" and "FUJI BALLOON H-35" available from Fuji Silysia Chemical Ltd.; trade names "CEL-STAR Z-20", "CEL-STAR Z-27", "CEL-STAR CZ-31T", "CEL-STAR Z-36", "CEL-STAR Z-39", "CEL-STAR T-36" and "CEL-STAR PZ-6000" available from Tokai Kogyo Co. Ltd.; trade names "SEILAX FINE BALLOON" available from Fine Balloon KK; trade names "Q-CEL® 5020", "Q-CEL® 7014", "SPHERICEL® 110P8", "SPHERICEL® 25P45", "SPHERICEL® 34P30" and "SPHERICEL® 60P18" available from Potters-Ballotini Co., Ltd.; trade names "SUPER BALLOON BA-15" and "SUPER BALLOON 732C" available from Showa Chemical Industry Co., Ltd.; and the like.

The average particle diameter of the hollow particles used is not particularly limited. For example, it can be selected from a range of 1 µm to 500 µm, preferably 5 µm to 400 µm, more preferably 10 µm to 300 µm, or yet more preferably 10 µm to 200 µm (e.g. 10 µm to 150 µm). The average particle diameter of the hollow particles is usually suitably 50% of the thickness of the viscoelastic layer (B) or smaller, or preferably 30% or smaller (e.g. 10% or smaller).

The specific gravity of the hollow particles is not particularly limited. In view of uniform dispersibility and mechanical strength, etc., for instance, it can be selected from a range of 0.1 g/cm$^3$ to 1.8 g/cm$^3$, preferably 0.1 g/cm$^3$ to 1.5 g/cm$^3$, or more preferably 0.1 g/cm$^3$ to 0.5 g/cm$^3$ (e.g. 0.2 g/cm$^3$ to 0.5 g/cm$^3$).

The amount of the hollow particles used is not particularly limited. For instance, it can be about 1 to 70% by volume of the total viscoelastic layer (B). It is usually suitably about 5 to 50% by volume, or preferably about 10 to 40% by volume.

[Bubbles]

The viscoelastic layer (B) may have bubbles. The inclusion of bubbles in the viscoelastic layer (B) can increase the cushioning effect of the PSA sheet, increasing the flexibility. When the PSA sheet is highly flexible, the PSA sheet is more likely to deform to conform to unevenness or steps on an adherend surface, thereby allowing its adhesive face to tightly adhere to the adherend surface. Tighter adhesion of the adhesive face to the adherend surface may advantageously contribute to increase the peel strength to a low polar surface and various other types of surface. Increased flexibility of the PSA sheet may also contribute to reduce the repulsive force of the PSA sheet. By this means, when the PSA sheet is adhered to conform to a curved surface or an adherend surface having steps, or when the adherend to which the PSA sheet has been adhered is deformed, etc., the PSA sheet can be effectively suppressed from peeling off (floating above) the adherend surface due to its own repulsive force.

The viscoelastic layer (B) may comprise both a filler (e.g. hollow particles) and bubbles such as those described above. A PSA sheet comprising such a viscoelastic layer (B) is preferable since it is likely to have well-balanced flexibility and cohesive strength.

The bubbles contained in the viscoelastic layer (B) may be independent bubbles, successive bubbles, or a mixture of these. From the standpoint of the cushioning effect, a viscoelastic layer (B) comprising many independent bubbles is more preferable. Preferably, many of the bubbles comprised in the viscoelastic layer (B) are independent bubbles. With respect to independent bubbles, the gaseous component included in the bubbles (gas component forming the bubbles; or "bubble-forming gas" hereinafter) is not particularly limited, and it can be various gaseous components such as insert gases including nitrogen, carbon dioxide, argon, etc., as well as various gaseous components such as air, etc. When the polymerization, etc., are carried out in a state containing the bubble-forming gas, it is preferable to use, as the bubble-forming gas, a gas species that does not inhibit the reaction(s). From such a standpoint and in respect of cost, etc., nitrogen can be preferably used as the bubble-forming gas.

In typical, the shapes of bubbles are more or less globular while they are not limited to such shapes. The average diameter of bubbles (average bubble diameter) is not particularly limited. It can be selected, for instance, from a range of 1 µm to 1000 µm, preferably 10 µm to 500 µm, or more preferably 30 µm to 300 µm. The average bubble diameter is usually suitably 50% of the thickness of the viscoelastic layer (B) or smaller, or preferably 30% or smaller (e.g. 10% or smaller).

The average bubble diameter can be determined typically by scanning electron microscopy (SEM), preferably by measuring 10 or more bubbles for their diameters and arithmetically averaging the results. For this, with respect to non-globular bubbles, they are converted to globular bubbles having the same volumes to determine the average bubble diameter.

When the viscoelastic layer (B) have bubbles, the volume ratio of the bubbles contained (bubble content) in the viscoelastic layer (B) is not particularly limited. It can be suitably selected so as to obtain aiming cushioning effect and flexibility. Relative to the viscoelastic layer (B)'s volume (referring to its apparent volume, which can be determined from the thickness and area of the viscoelastic layer (B)), it can be about 3 to 70% by volume, or it is usually suitably about 5 to 50% by volume, or preferably about 8 to 40% by volume.

In the art disclosed herein, the method for forming a viscoelastic layer having bubbles (bubble-containing viscoelastic layer) is not particularly limited, and a known method can be suitably employed. For example, can be suitably employed (1) a method such that a viscoelastic layer-forming composition pre-mixed with a bubble-forming gas (preferably a composition that forms a viscoelastic material upon curing by active energy rays such as UV rays, etc.) is cured to form a bubble-containing viscoelastic layer, (2) a method such that a viscoelastic layer-forming composition containing a foaming agent is used and by forming bubbles from the foaming agent, a form a bubble-containing viscoelastic layer is formed, and like method. The foaming agent used is not particularly limited. A suitable one can be selected from known foaming agents. For instance, foaming agents such as thermally expandable microspheres and the like can be preferably used.

In forming a bubble-containing viscoelastic layer by the method (1), the method for preparing the viscoelastic layer-forming composition pre-mixed with a bubble-forming gas is not particularly limited. A known bubble-mixing method can be used. For instance, a known bubble-mixing device can be used in the method. Examples of a bubble-mixing device include a device comprising a stator having fine teeth on a disc having a through-hole at the center, and a rotor opposing the stator and having fine teeth on a disc similarly to the stator. In between the stator teeth and rotor teeth in such a bubble-mixing device, a viscoelastic layer-forming composition prior to bubble mixing (viscoelastic layer-forming composition precursor) is introduced, and while the rotor is allowed to rapidly spin, a gas component for forming bubbles (bubble-forming gas) is introduced into the viscoelastic layer-forming composition precursor through the through-hole. By this, a viscoelastic layer-forming composition can be obtained with bubbles finely dispersed and mixed therein.

A bubble-containing viscoelastic layer can be formed by, for example, applying such a composition mixed with a bubble-forming gas to a prescribed surface and allowing it to cure. As the curing method, a heating method, a method where an active energy ray (e.g. UV ray) is irradiated, etc., can be preferably employed. By curing a viscoelastic layer-forming composition mixed with a bubble-forming gas by means of heating or irradiating an active energy ray, etc., while in a state where bubbles are stably retained, a bubble-containing viscoelastic layer can be preferably formed.

From the standpoint of the mixing compatibility of a bubble-forming gas or the stability of bubbles, a surfactant may be added to the viscoelastic layer-forming composition. Examples of such a surfactant include ionic surfactants, hydrocarbon-based surfactants, silicone-based surfactants, fluorine-based surfactants and the like. Among these, fluorine-based surfactants are preferable. In particular, a fluorine-based surfactant having an oxyalkylene group (typically an oxyalkylene group having 2 to 3 carbon atoms) along with a fluorinated hydrocarbon group is preferable. Fluorine-based surfactants can be used singly as one species or in combination of two or more species. Examples of preferably usable commercial fluorine-based surfactants include trade name "SURFLON S-393" available from AGC Seimi Chemical Co., Ltd.

The amount of surfactant used is not particularly limited. For instance, it can be about 0.01 to 3 parts by mass based on solid content relative to 100 parts by mass of the acrylic polymer contained in the viscoelastic layer (B).

As far as the effects by the present invention are not significantly impaired, the viscoelastic layer (B) may contain as necessary known additives such as a plasticizer, softening agent, colorants (pigments, dyes, etc.), antioxidant, leveling agent, stabilizing agent, preservative, etc. For example, when a viscoelastic layer (B) is formed by curing a PSA composition by photopolymerization, in order to color the viscoelastic layer (B), a pigment (coloring pigment) can be used as a colorant in an amount that does not significantly inhibit the photopolymerization. When black color is desired for the color of a viscoelastic layer (B), for instance, carbon black can be preferably used as the colorant. In view of the degree of coloration and photopolymerizability, etc., the amount of the pigment such as carbon black used is desirably selected from a range up to 0.15 part by mass (e.g. 0.001 to 0.15 part by mass) relative to 100 parts by mass of the viscoelastic layer (B) of interest, or preferably from a range of 0.01 to 0.1 part by mass.

<PSA Sheets>

Figure 2:
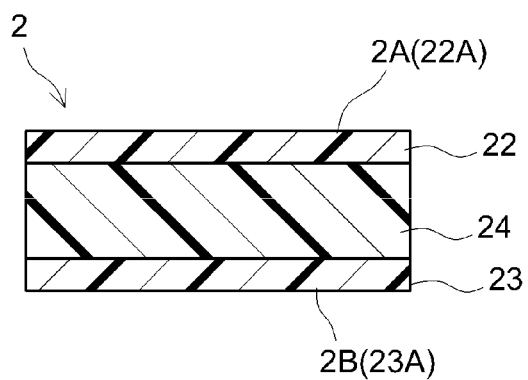
FIG. 2 shows a cross-sectional view schematically illustrating the constitution of a PSA sheet according to another embodiment.
Figure 3:
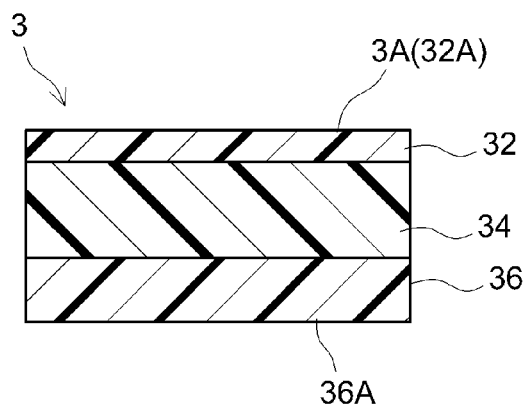
FIG. 3 shows a cross-sectional view schematically illustrating the constitution of a PSA sheet according to another embodiment.

FIG. 1 to FIG. 3 schematically show typical constitution examples of the PSA sheet disclosed herein.

PSA sheet 1 shown in FIG. 1 is a double-faced PSA sheet comprising a PSA layer (A) 12, and a viscoelastic layer (B) 14 supporting the back face thereof. Viscoelastic layer (B) 14 is an adhesive layer. The first surface (first adhesive face) 1A of PSA sheet 1 is constituted by surface 12A of PSA layer (A) 12 while the second surface (second adhesive face) 1B of PSA sheet 1 is constituted by surface 14A of viscoelastic layer (adhesive layer) (B) 14. In PSA sheet 1 having such a constitution, the first adhesive face 1A may exhibit good adhesiveness to a low polar adherend. Since it comprises a thick viscoelastic layer (B) 14 (typically having a thickness of 200 μm or larger), it may have excellent flexibility. Taking advantage of such a feature, PSA sheet 1 can be preferably used, for instance, in an embodiment where the first adhesive face 1A is adhered to a low polar adherend such as a polyolefin resin and the like while the second adhesive face 1B is adhered to various types of adherend. PSA sheet 1 is preferable, for instance, as a double-faced PSA sheet for tightly joining various types of adherend to a low polar adherend.

PSA sheet 2 shown in FIG. 2 is a double-faced PSA sheet formed of a first PSA layer (A) 22, a second PSA layer (A) 23 and a viscoelastic layer (B) 24 placed between the two. Viscoelastic layer (B) 24 may be an adhesive layer or a non-adhesive layer. The first surface (first adhesive face) 2A of PSA sheet 2 is formed by surface 22A of the first PSA layer (A) 22 supported by the first face of viscoelastic layer (B) 24. The second surface (second adhesive face) 2B of PSA sheet 2 is formed by surface 23A of the second PSA layer (A) 23 supported by the second face of viscoelastic layer (B) 24. In PSA sheet 2 having such a constitution, both the first adhesive face 2A and second adhesive face 2B may exhibit good adhesiveness to a low polar adherend. With the inclusion of the thick viscoelastic layer (B) 24, PSA sheet 2 may have excellent flexibility. Taking advantage of such a feature, PSA sheet 2 may be preferably used, for instance, in an embodiment where the first adhesive face 2A and second adhesive face 2B are adhered to low polar adherends, respectively. PSA sheet 2 is preferable, for instance, as a double-faced PSA sheet for tightly joining low polar adherends together.

PSA sheet 3 shown in FIG. 3 is a single-faced PSA sheet comprising a PSA layer (A) 32, a viscoelastic layer (B) 34 supporting the back face thereof, and a support substrate 36 further supporting the back face thereof. Viscoelastic layer (B) 34 is typically an adhesive layer. PSA sheet 3 comprises an adhesive face 3A formed by surface 32A of PSA layer (A) 32.

Support substrate 36 may be, for instance, a plastic film such as a polyester film, etc.; a foam sheet formed of a foam such as a polyurethane foam, etc.; a woven or non-woven fabric of a single or mixed yarn of various fibrous materials, etc.; a metal foil such as aluminum foil, copper foil, etc.; and the like.

PSA sheet 3 having such a constitution can be preferably used, for instance, in an embodiment where the adhesive face 3A is adhered to a low polar adherend.

In the respective PSA sheets 1 to 3 shown in FIGS. 1 to 3, each of viscoelastic layers (B) 14, 24 and 34 may comprise bubbles, hollow particles, or both bubbles and hollow particles. From the standpoint of reducing the weight of the PSA sheet, preferable examples include an embodiment where the viscoelastic layer (B) comprises at least either bubbles or hollow particles, an embodiment where the viscoelastic layer (B) comprises at least hollow particles, an embodiment where the viscoelastic layer (B) comprises both bubbles and hollow particles, etc.

Hollow particles or bubbles included in the viscoelastic layer (B) may decrease smoothness of the surface of the viscoelastic layer (B), depending on their size or amount included. If the surface smoothness of the viscoelastic layer (B) decreases, for instance, when the viscoelastic layer (B) is an adhesive layer and its surface is directly adhered to an adherend, tight adhesion to the adherend may tend to be insufficient, and the peel strength may tend to decrease. In the PSA sheet disclosed herein, a PSA layer (A) constituting an adhesive face is placed on the viscoelastic layer (B). Accordingly, the tightness of adhesion between an adherend and the adhesive face is less susceptible to influence by the surface smoothness of the viscoelastic layer (B). Thus, the proportion of hollow particles or bubbles in the viscoelastic layer (B) can be easily adjusted and a PSA sheet with well-balanced properties can be suitably obtained.

In PSA sheets 1 to 3 exemplified in FIGS. 1 to 3, each layer shown in the drawings may have a single-layer structure or multi-layer structure consisting of two or more sub-layers (i.e. a structure including multiple sub-layers). A layer not shown in the drawings may also be included. For instance, other layer(s) may be placed between any layers in FIGS. 1 to 3. An example of such a constitution is a constitution where a second PSA layer (A) is further placed between viscoelastic layer (B) 34 and support substrate 36. For instance, the PSA sheet disclosed herein may comprise, in addition to the PSA layer (A) constituting an adhesive face such as the aforementioned second PSA layer (A), a PSA layer (A) not exposed on a surface of the PSA sheet (i.e. not constituting an adhesive face). The other layer(s) may or may not be PSA layer(s). In other words, the other layer(s) may be non-adhesive layer(s). Examples include a plastic film, primer layer, release layer, colored layer such as a printed layer and the like, metal deposition layer, antistatic layer, surface-protective layer, etc.

The PSA sheet disclosed herein may be in an embodiment where its adhesive face(s) are protected with release liner(s) before its use (i.e. before adhered to an adherend). As the release liner, conventional release papers and the like can be used without particular limitations. For example, can be used a release liner having a release layer on a surface of a substrate such as a plastic film or paper, etc.; a release liner formed from a poorly adhesive material such as a fluorine-based polymer (polytetrafluoroethylene, etc.) and polyolefin-based resin (polyethylene, polypropylene, etc.); and the like. The release layer may be formed, for instance, by subjecting the substrate to a surface treatment by a release agent with examples including a silicone-based, long chain alkyl-based, fluorine-based release agents and molybdenum (IV) sulfide, etc.

Alternatively, in a single-faced PSA sheet such as PSA sheet 3 shown in FIG. 3, it may be in a form such that with the surface 36A of support substrate 36 being a release face, by winding PSA sheet 3, the surface 36A of support substrate 36 contacts and protects the adhesive face 3A. As in this, the PSA sheet may be in a form such that the support substrate serves as a release liner as well.

In the art disclosed herein, the thickness of the PSA layer (A) constituting an adhesive face is not particularly limited. For instance, it can be 1 μm or larger. From the standpoint of the peel strength, the PSA layer (A) has a thickness of suitably 5 μm or larger, preferably 10 μm or larger, or more preferably 20 μm or larger (e.g. 30 μm or larger, typically 35 μm or larger). In a preferable embodiment, the thickness can be 40 μm or larger (typically 50 μm or larger), 70 μm or larger, or even 90 μm or larger (e.g. larger than 100 μm). From the standpoint of the cohesive strength, etc., the PSA layer (A) usually has a thickness of suitably 200 μm or smaller, preferably 180 μm or smaller, or more preferably 160 μm or smaller (e.g. 150 μm or smaller). Because of the inclusion of a viscoelastic layer (B), even with the thickness of the PSA layer (A) being, for instance, smaller than 150 μm, the PSA sheet disclosed herein can effectively conform to unevenness or steps on an adherend surface to stick tightly to the adherend surface. This can provide high peel strength. From such a standpoint, the thickness of the PSA layer (A) can be 120 μm or smaller, 100 μm or smaller, or even 80 μm or smaller (e.g. 60 μm or smaller).

The viscoelastic layer (B) typically has a thickness of 200 μm or larger. The viscoelastic layer (B) is highly flexible since it is of a viscoelastic material. Thus, by supporting the PSA layer (A) by the viscoelastic layer (B), the surface (adhesive face) of the PSA layer (A) can preferably provide tight adhesion to an adherend. From the standpoint of the flexibility, the viscoelastic layer (B) has a thickness of 250 μm or larger, or 300 μm or larger (e.g. 350 μm or larger). From the standpoint of obtaining higher flexibility, the thickness of the viscoelastic layer (B) can be 500 μm or larger, or even 700 μm or larger. The art disclosed herein can be preferably implemented in an embodiment where the viscoelastic layer (B) has a thickness of 1 mm or larger. The upper limit of the thickness of the viscoelastic layer (B) is not particularly limited. For instance, it can be about 10 mm or below. From the standpoint of the ease of formation or cohesiveness of the viscoelastic layer (B), etc., the viscoelastic layer (B) usually has a thickness of suitably 5 mm or smaller, or preferably 3 mm or smaller (e.g. 2 mm or smaller).

Although not particularly limited, the thickness of the viscoelastic layer (B) can be, for instance, equal to or larger than the thickness of the PSA layer (A) while it is usually suitably 1.5 times or larger, preferably 2 times or larger, or more preferably 3 times or larger (e.g. 5 times or larger). By this, greater effects can be produced by the inclusion of the viscoelastic layer (B) in the PSA sheet disclosed herein. The thickness of the viscoelastic layer (B) can be, for instance, 50 times the thickness of the PSA layer (A) or smaller. From the standpoint of the balance between peel strength and cohesive strength, etc., it is usually suitably 20 times or smaller, or preferably 10 times or smaller.

The combined thickness of the PSA layer (A) and viscoelastic layer (B) (excluding the thickness of any support substrate or release liner) is typically larger than 200 μm, preferably larger than 300 μm, more preferably larger than 350 μm, even more preferably larger than 400 μm, or particularly preferably larger than 500 μm (e.g. larger than 700 μm). The art disclosed herein can also be preferably practiced in an embodiment where the combined thickness of the PSA layer (A) and viscoelastic layer (B) is larger than 1 mm. The upper limit of the combined thickness is not particularly limited. For example, it can be about 15 mm or smaller while it is usually suitably about 10 mm or smaller, preferably 7 mm or smaller, or more preferably 5 mm or smaller (e.g. 3 mm or smaller). When the viscoelastic layer (B) is an adhesive layer (PSA layer (B)), the combined thickness of the PSA layer (A) and viscoelastic layer (B) refers to the overall thickness including the PSA layer (A) and PSA layer (B).

The PSA sheet disclosed herein may comprise a support substrate, for instance, as the single-faced PSA sheet 3 shown in FIG. 3. As the support substrate, a suitable one can be selected and used in accordance with the intended application of the PSA sheet, for instance, among plastic films such as polypropylene films, ethylene-propylene copolymer films, polyester films, polyvinyl chloride films, etc.; foam sheets made of foam such as polyurethane foam, polyethylene foam, polychloroprene foam, etc.; woven fabrics and non-woven fabrics (meaning to include paper such as Washi, high-grade paper, etc.) of a single species or a blend, etc., of various species of fibrous substances (which can be natural fibers such as hemp, cotton, etc.; synthetic fibers such as polyester, vinylon, etc.; semi-synthetic fibers such as acetate, etc.; and the like); metal foil such as aluminum foil, copper foil, etc.; and the like. The plastic film (typically referring to a non-porous plastic film, which should be conceptually distinguished from a woven fabric and a non-woven fabric) may be a non-stretched film, or a stretched (uni-axially stretched or bi-axially stretched) film.

The thickness of the support substrate can be suitably selected depending on the purpose while it is generally about 2 μm to 500 μm. Usually, a substrate of about 10 μm to 200 μm thickness can be preferably used. When the support substrate is a foam sheet, the upper limit of the support substrate's thickness can be, for instance, about 10 cm while it is usually suitable to be about 5 cm (e.g. about 2 cm).

The surface of the support substrate on the side provided with a PSA layer can be subjected to a surface treatment to increase the non-releasability (anchoring ability) of the surface, with examples including a corona discharge treatment, formation of a primer layer, etc. The other surface of the support substrate opposing the side provided with the PSA layer may be subjected to a suitable treatment, such as a treatment to increase the releasability of the surface (formation of a release layer, laminating with a poorly adhesive material such as a polyolefin film, etc.), a treatment to increase the non-releasability or printability of the surface (corona discharge treatment, etc.), a treatment to make the surface more decorative (e.g. printing, metal deposition), and the like.

The PSA sheet disclosed herein can be preferably used in an embodiment where the adhesive face consisting of the PSA layer (A) is adhered to various types of adherend. Examples of preferable adherends for the PSA sheet disclosed herein include, but not limited to adherends made of resins including polyolefin resins such as a polyethylene (PE) resin, polypropylene (PP) resin and the like, an acrylonitrile-butadiene-styrene copolymer (ABS) resin, high impact polystyrene (HIPS) resin, polycarbonate (PC) resin, a polymer blend (PC/ABS) of PC and ABS, and the like.

The PSA sheet disclosed herein has a thickness larger than 200 μm with the inclusion of the viscoelastic layer (B), yet is highly flexible (e.g., adaptable or deformable). Therefore, when joining these materials, it can conform to unevenness or steps present on surfaces of the materials by means of deformation of the PSA so as to produce a quality joint between two materials. Thus, the PSA sheet is useful for instance, for joining components in various types of OA equipment, house appliances, automobiles, and so on (e.g. for fastening various types of components in such products).

Several worked examples relating to the present invention are described below, but the present invention is not intended to be limited to these examples. In the description below, "parts" and "%" are based on the mass unless otherwise specified.

[Fabrication of PSA Sheets]

(Sample 1A)

100 parts of a styrene-isoprene block copolymer (available from Zeon Corporation, trade name "QUINTAC 3520", 15% styrene content, 78% diblock fraction) as a base polymer, 40 parts of a terpene phenol resin, 30 parts of a terpene resin, 0.75 part by solid content of an isocyanate compound (available from Nippon Polyurethane Industry Co., Ltd., trade name "CORONATE L"), 3 parts of an anti-aging agent, and toluene as a solvent were mixed with stirring to prepare a PSA composition 1A at 50% NV.

Herein, as the terpene phenol resin, two species, namely, trade name "YS POLYSTAR S145" (softening point 145° C., hydroxyl value 100 mgKOH/g) and trade name "YS POLYSTAR T145" (softening point 145° C., hydroxyl value 60 mgKOH/g) both available from Yasuhara Chemical Co., Ltd., were used at a mass ratio of 1:1 in a combined amount of 40 parts. As for the terpene resin, was used trade name "YS RESIN PX1150N" (softening point 115° C., hydroxyl value below 1 mgKOH/g) available from Yasuhara Chemical Co., Ltd. As the anti-aging agent, was used trade name "IRGANOX CB612" available from BASF Corporation (a blend of trade names "IRGAFOS 168" and "IRGANOX 565" both available from BASF Corporation at a mass ratio of 2:1).

A sheet of release liner was obtained, wherein high grade paper had been laminated on one face with a 25 μm thick PE layer which had been then subjected to a release treatment by a silicone-based release agent. To the release face of the release liner, the PSA composition 1A was applied and dried at 120° C. for 3 minutes to form a 140 μm thick PSA layer 1A. As Sample 1A, the PSA layer 1A was used as it was.

(Sample 2A)

A PSA composition 2A was prepared in the same manner as the preparation of the PSA composition 1A except that in place of 40 parts of the terpene phenol resin, was used 40 parts of an aromatic petroleum resin (available from JX Nippon Oil & Energy Corporation, trade name "NISSEKI NEOPOLYMER 150", softening point 155° C., hydroxyl value below 1 mgKOH/g). Except that the PSA composition 2A was used, a 140 μm thick PSA layer 2A was formed in the same manner as Sample 1A. As Sample 2A, the PSA layer 2A was used as it was.

(Sample 3A)

A PSA composition 3A was prepared in the same manner as the preparation of the PSA composition 1A except that in addition to 40 parts of the terpene phenol resin, was further used 20 parts of an aromatic petroleum resin (available from JX Nippon Oil & Energy Corporation, trade name "NISSEKI NEOPOLYMER 150", softening point 155° C., hydroxyl value below 1 mgKOH/g). Except that the PSA composition 3A was used, a 140 μm thick PSA layer 3A was formed in the same manner as Sample 1A. As Sample 3A, the PSA layer 3A was used as it was.

(Sample 1B)

To a monomer mixture consisting of 85 parts of 2-ethylhexyl acrylate (2EHA) and 15 parts of acrylic acid (AA), were added 0.05 part of 2,2-dimethoxy-1,2-diphenylethane-1-one (available from BASF Japan Ltd., trade name "IRGACURE 651") and 0.05 part of 1-hydroxy-cyclohexyl phenyl ketone (available from BASF Japan Ltd., trade name "IRGACURE 184") as photopolymerization initiators. Subsequently, the monomer mixture was irradiated with UV rays to a viscosity of about 15 Pa·s to prepare a monomer syrup (partially-polymerized product) in which the monomer mixture had been partially polymerized. The viscosity was measured using a BH viscometer with a No. 5 rotor at a rotational speed of 10 rpm at a measurement temperature of 30° C.

To 100 parts of the monomer syrup, were added 0.15 part of dipentaerythritol hexaacrylate (DPHA) and 15 parts of hollow glass balloons (40 μm average particle diameter, trade name "FUJI BALLOON H-40" available from Fuji Silysia Chemical Ltd.) to obtain a PSA composition 1B.

Two sheets of 38 μm thick polyethylene terephthalate (PET) film were obtained with one face thereof being a release face treated with a silicone-based release agent. To 100 parts of the PSA composition 1B, was added 0.03 part of "IRGACURE 651". The resultant was applied to the release face of the first sheet of PET film and covered with the release face of the second sheet of PET film. UV rays were irradiated to both surfaces at an intensity of 5 mW/cm$^2$ for 3 minutes. For the UV irradiation, trade name "BLACK LIGHT" available from Toshiba Corporation was used. UV rays were measured using an industrial UV checker (available from Topcon Technohouse Corporation, trade name "UVR-T1") of about 350 nm peak sensitivity wavelength. A 800 μm thick PSA layer 1B was thus formed. The PSA layer 1B was a PSA layer (viscoelastic layer) containing hollow particles, but free of bubbles. As Sample 1B, the PSA layer 1B was used as it was.

(Sample 2B)

In the same manner as Sample 1B except that a monomer mixture consisting of 90 parts of 2EHA and 10 parts of AA was used, was prepared a monomer syrup in which the monomer mixture had been partially polymerized.

To 100 parts of the monomer syrup, were added 0.08 part of 1,6-hexanediol diacrylate (HDDA) as a crosslinking agent and 12.5 parts of "FUJI BALLOON H-40". The resultant was deaerated. After deaerated, was added 0.7 part of a fluorine-based surfactant (trade name "SURFLON S-393" available from AGC Seimi Chemical Co., Ltd.; an acrylic copolymer having polyoxyethylene and fluorinated hydrocarbon groups in side chains; Mw 8300) to obtain a PSA composition precursor. Using the aforementioned bubble-mixing device, the PSA composition precursor was stirred with nitrogen gas introduced through the through-hole of the device to obtain a PSA composition (bubble-containing PSA composition) 2B with bubbles dispersed and mixed therein. The bubbles were mixed in to about 20% by volume to the total volume of the bubble-containing PSA composition 2B.

Two sheets of 38 μm thick polyethylene terephthalate (PET) film were obtained with one face thereof being a release face treated with a silicone-based release agent. To 100 parts of the bubble-containing PSA composition 2B, was added 0.04 part of "IRGACURE 651". Were further admixed 0.5 part of an antioxidant (available from BASF Japan Ltd., trade name "IRGANOX 1010") and 0.02 part of a pigment (available from Dainichiseika Color and Chemicals Mfg. Co., Ltd., trade name "AT DN101"). The resultant was allowed to cure by UV irradiation in the same manner as Sample 1B to form a 800 μm thick PSA layer 2B. The PSA layer 2B was a PSA layer (viscoelastic layer) comprising hollow particles and bubbles. As Sample 2B, the PSA layer 2B was used as it was.

(Sample 1C)

The PET film covering one face of a PSA layer 1B was removed. To the exposed surface, a PSA layer 1A was adhered with a laminator (200 mm/min, 0.2 MPa). By this, was obtained a PSA sheet (Sample 1C) formed of an 800 μm thick PSA layer 1B and a 140 μm thick PSA layer 1A retained on one face thereof.

(Sample 2C-6C)

The PET film covering one face of a PSA layer 2B was removed. To the exposed surface, in the same manner as the preparation of Sample 1C, a PSA layer 1A was adhered. By this, was obtained a PSA sheet (Sample 2C) formed with an 800 μm thick PSA layer 2B and a PSA layer 1A retained on one face thereof.

To PSA layers 1B and 2B, PSA layers 2A were adhered, respectively, in place of PSA layers 1A. Otherwise, in the same manner as the preparation of Samples 1C and 2C, PSA sheets were obtained as Samples 3C and 4C.

To PSA layers 1B and 2B, PSA layers 3A were adhered, respectively, in place of PSA layers 1A. Otherwise, in the same manner as the preparation of Samples 1C and 2C, PSA sheets were obtained as Samples 5C and 6C.

[90° Peel Strength Measurement]

To one face of each PSA sheet sample, a 130 μm thick aluminum foil treated with anodized aluminum (subjected to alumite treatment) was adhered for backing. The backed PSA sheet was cut to 25 mm wide by 70 mm long to obtain a test piece. With respect to Samples 1C to 6C, the surface of the PSA layer 1B or 2B was adhered to the aluminum foil.

A surface of a polypropylene plate (PP plate) as an adherend was washed with isopropanol (IPA). To the PP plate, the adhesive face of each test piece (for Samples 1C to 6C, the surface of PSA layer 1A, 2A or 3A) was press-bonded with a 5 kg roller moved back and forth twice. After press-bonded, the test piece was aged under an atmosphere at 23° C., 50% RH for 20 minutes. After aged, using a tensile tester (available from Shimadzu Corporation, device name "TENSILON"), under an atmosphere at 23° C., 50% RH, the test piece was peeled off from the adherend (PP plate) at a tensile speed of 300 mm/min at 90° peel angle while measuring the peel strength (N/25 mm). The results obtained are shown in Tables 1 and 2.

TABLE 1

| | | Sample | | | | |
|---|---|---|---|---|---|---|
| | | 1A | 2A | 3A | 1B | 2B |
| Base polymer (parts) | Quintac3520 | 100 | 100 | 100 | — | — |
| Tackifier resins (parts) | YS Resin PX1150N | 30 | 30 | 30 | — | — |
| | YS Polystar T145 | 20 | — | 20 | — | — |
| | YS Polystar S145 | 20 | — | 20 | — | — |
| | Nisseki Neopolymer150 | — | 40 | 20 | — | — |
| Isocyanate compound (parts) | | 0.75 | 0.75 | 0.75 | — | — |
| 90° Peel strength [N/25 mm] | | 22.9 | 38.3 | 51.2 | 14.8 | 13.8 |

TABLE 2

|  |  |  | Sample | | | | | |
| --- | --- | --- | --- | --- | --- | --- | --- | --- |
|  |  |  | 1C | 2C | 3C | 4C | 5C | 6C |
| PSA layer (A) (140 μm) | Type | | 1A | 1A | 2A | 2A | 3A | 3A |
|  | Base polymer (parts) | Quintac3520 | 100 | 100 | 100 | 100 | 100 | 100 |
|  | Tackifier resins (parts) | YS Resin PX1150N | 30 | 30 | 30 | 30 | 30 | 30 |
|  |  | YS Polystar T145 | 20 | 20 | — | — | 20 | 20 |
|  |  | YS Polystar S145 | 20 | 20 | — | — | 20 | 20 |
|  |  | Nisseki Neopolymer150 | — | — | 40 | 40 | 20 | 20 |
|  | Isocyanate compound (parts) | | 0.75 | 0.75 | 0.75 | 0.75 | 0.75 | 0.75 |
| Viscoelastic layer (B) (800 μm) | Type | | 1B | 2B | 1B | 2B | 1B | 2B |
| Evaluation | 90° Peel strength [N/25 mm] | | 28.6 | 33.8 | 43.5 | 44.9 | 67.7 | 76.7 |

As evident from Tables 1 and 2, as compared to Sample 1A consisting of a PSA layer (A) alone, in Sample 1C additionally including a layer of Sample 1B as a viscoelastic layer (B), the 90° peel strength increased by about 1.25 times. Even greater effects were obtained in Sample 2C which additionally included a layer of Sample 2B containing bubbles. More specifically, as compared to Sample 1A, the 90° peel strength increased by about 1.5 times. As compared to Sample 2A, the 90° peel strength increased by about 1.14 times in Sample 3C additionally including a layer of Sample 1B and by about 1.17 times in Sample 4C additionally including a layer of Sample 2B, respectively. As compared to Sample 3A, the 90° peel strength increased by about 1.3 times in Sample 5C additionally including a layer of Sample 1B and by about 1.5 times in Sample 6C additionally including a layer of Sample 2B, respectively.

As shown in Table 1, when PSA layers 1B and 2B were tested alone, the 90° peel strength of the bubble-containing PSA layer 2B was lower than the bubble-free PSA layer 1B. This result suggests that the surface of the PSA layer 2B was less smooth than that of the PSA layer 1B. On the contrary, as shown in Table 2, with respect to Samples 1C to 6C in which a PSA layer 1A, 2A or 3A was layered on a PSA layer 1B or 2B, as compared to Samples 1C, 3C and 5C using PSA layers 1B, Samples 2A, 4C and 6C which included PSA layers 2B tended to exhibit greater 90° peel strength. It is considered that with the PSA layers 1A to 3A layered on PSA layers 2B, the degree of surface smoothness of the PSA layer 2B affected the adhesive faces to lesser extent, whereby the effects by the inclusion of the highly flexible PSA layer 2B were suitably produced.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST 1, 2, 3 PSA sheets
12, 22, 23, 32 PSA layers (A)
14, 24, 34 viscoelastic layers (B)
36 support substrate

What is claimed is:

1. A pressure-sensitive adhesive sheet comprising
a pressure-sensitive adhesive layer constituting an adhesive face, and
a viscoelastic layer supporting the pressure-sensitive adhesive layer, wherein
the pressure-sensitive adhesive layer is soft solid and comprises a base polymer that is a block copolymer of a monovinyl-substituted aromatic compound and a conjugated diene compound,
the base polymer comprises 30% by mass or more of a diblock copolymer,
the viscoelastic layer comprises hollow particles and has a thickness of 200 μm or larger.

2. The pressure-sensitive adhesive sheet according to claim 1, wherein the viscoelastic layer further comprises bubbles.

3. The pressure-sensitive adhesive sheet according to claim 1, wherein the viscoelastic layer comprises an acrylic polymer as a base polymer.

4. The pressure-sensitive adhesive sheet according to claim 1 comprising a pressure-sensitive adhesive layer as the viscoelastic layer.

5. The pressure-sensitive adhesive sheet according to claim 1, wherein the pressure-sensitive adhesive layer comprises a tackifier resin $T_H$ having a softening point of 120° C. or above and a tackifier resin $T_L$ having a softening point below 120° C.

6. The pressure-sensitive adhesive sheet according to claim 1, wherein the pressure-sensitive adhesive layer comprises a tackifier resin $T_H$ having a softening point of 120° C. or above, and the tackifier resin $T_H$ comprises a tackifier resin $T_{HR1}$ having an aromatic ring and having a hydroxyl value of 30 mgKOH/g or lower.

7. The pressure-sensitive adhesive sheet according to claim 1 comprising, as the pressure-sensitive adhesive layer, a first pressure-sensitive adhesive layer supported by a first face of the viscoelastic layer and a second pressure-sensitive adhesive layer supported by a second face of the viscoelastic layer.

8. The pressure-sensitive adhesive sheet according to claim 1, wherein the viscoelastic layer is thicker by 1.5 times up to 50 times than the pressure-sensitive adhesive layer.

9. The pressure-sensitive adhesive sheet according to claim 1, wherein the pressure-sensitive adhesive layer comprises 20 parts by mass up to 200 parts by mass of a tackifier resin relative to 100 parts by mass of the base polymer.

10. The pressure-sensitive adhesive sheet according to claim 1, wherein the base polymer comprises 50% by mass or more of the diblock copolymer.

11. The pressure-sensitive adhesive sheet according to claim 1, wherein 50% by mass or greater of the base polymer is a linear block copolymer.

12. The pressure-sensitive adhesive sheet according to claim 1, wherein the base polymer is a styrene-based block copolymer.

13. The pressure-sensitive adhesive sheet according to claim 12, wherein essentially all of the styrene-based block copolymer is a styrene-isoprene block copolymer.

14. The pressure-sensitive adhesive sheet according to claim 12, wherein the styrene-based block copolymer has a styrene content of 5 to 40% by mass.

15. The pressure-sensitive adhesive sheet according to claim 14, wherein the styrene-based block copolymer comprises 65% by mass or more of the diblock copolymer.

16. The pressure-sensitive adhesive sheet according to claim 1, wherein the pressure-sensitive adhesive layer comprises an isocyanate compound in an amount of more than zero part by mass and 10 parts by mass or less relative to 100 parts by mass of the base polymer.

17. The pressure-sensitive adhesive sheet according to claim 1, wherein the pressure-sensitive adhesive layer comprises the base polymer and a second polymer in an amount of 30 parts by mass or less relative to 100 parts by mass of the base polymer.

18. The pressure-sensitive adhesive sheet according to claim 1, wherein the thickness of the pressure-sensitive adhesive layer is 1 μm or larger and 150 μm or smaller.

19. The pressure-sensitive adhesive sheet according to claim 1, wherein the thickness of the viscoelastic layer is 200 μm or larger and 3 mm or smaller.

20. The pressure-sensitive adhesive sheet according to claim 1, wherein the base polymer is a styrene-isoprene block copolymer, the styrene-based block copolymer has a styrene content of 5 to 40% by mass, the styrene-based block copolymer comprises 65% by mass or more of the diblock copolymer, the pressure-sensitive adhesive layer comprises a tackifier resin $T_H$ having a softening point of 120° C. or above and a tackifier resin $T_L$ having a softening point below 120° C., and the tackifier resin $T_H$ comprises a tackifier resin $T_{HR1}$ having an aromatic ring and having a hydroxyl value of 30 mgKOH/g or lower, the total amount of the tackifier resins contained in the pressure-sensitive adhesive layer is 20 parts by mass up to 200 parts by mass relative to 100 parts by mass of the base polymer, the pressure-sensitive adhesive layer comprises an isocyanate compound in an amount of more than zero part by mass and 10 parts by mass or less relative to 100 parts by mass of the base polymer, the viscoelastic layer comprises an acrylic polymer as a base polymer, the viscoelastic layer is thicker by 1.5 times up to 50 times than the pressure-sensitive adhesive layer.

\* \* \* \* \*